US009979855B2

(12) United States Patent
Nishimura et al.

(10) Patent No.: US 9,979,855 B2
(45) Date of Patent: May 22, 2018

(54) IMAGE PROCESSING SYSTEM, IMAGE PROCESSING APPARATUS, INSTRUCTION SERVER, AND STORAGE MEDIUM

(71) Applicant: Konica Minolta, Inc., Chiyoda-ku, Tokyo (JP)

(72) Inventors: Ryosuke Nishimura, Toyokawa (JP); Toshiya Shozaki, Osaka (JP); Tomoko Maruyama, Toyokawa (JP); Shoko Haba, Toyokawa (JP); Jun Shiraishi, Toyokawa (JP)

(73) Assignee: KONICA MINOLTA, INC., Chiyoda-Ku, Tokyo (JP)

( * ) Notice: Subject to any disclaimer, the term of this patent is extended or adjusted under 35 U.S.C. 154(b) by 0 days. days.

(21) Appl. No.: 15/078,272

(22) Filed: Mar. 23, 2016

(65) Prior Publication Data
US 2016/0286079 A1 Sep. 29, 2016

(30) Foreign Application Priority Data

Mar. 25, 2015 (JP) .................................. 2015-062425

(51) Int. Cl.
H04N 1/36 (2006.01)
H04L 29/08 (2006.01)
H04N 1/00 (2006.01)
H04N 1/32 (2006.01)
G06F 3/12 (2006.01)
H04L 29/06 (2006.01)

(52) U.S. Cl.
CPC ............ *H04N 1/36* (2013.01); *G06F 3/1203* (2013.01); *G06F 3/1221* (2013.01);
(Continued)

(58) Field of Classification Search
None
See application file for complete search history.

(56) References Cited

U.S. PATENT DOCUMENTS

2013/0060950 A1   3/2013 Furuta et al.
2013/0212413 A1*  8/2013 Berndt .................. G06F 1/3203
                                          713/310
(Continued)

FOREIGN PATENT DOCUMENTS

JP   2003-018235 A   1/2003
JP   2013/054421 A   3/2013
(Continued)

OTHER PUBLICATIONS

Extended European Search Report dated Sep. 5, 2016, issued by the European Patent Office in corresponding European Application No. 16160629.8. (11 pages).
(Continued)

*Primary Examiner* — Miya J Williams
(74) *Attorney, Agent, or Firm* — Buchanan Ingersoll & Rooney PC

(57) ABSTRACT

An image processing system includes: an image processing apparatus; an instruction server configured to transmit instruction information to the image processing apparatus via a router having a firewall function; and a session server configured to set up a session between the image processing apparatus and the instruction server. The image processing apparatus is configured to switch, in a case where the state of the image processing apparatus is a power saving state when a time specified by a transmission interval elapses from transmission of a connection confirmation packet for the session with the instruction server, to a state in which at least the connection confirmation packet can be transmitted.

18 Claims, 19 Drawing Sheets

(52) U.S. Cl.
CPC .......... *G06F 3/1236* (2013.01); *G06F 3/1288* (2013.01); *H04L 67/141* (2013.01); *H04L 69/28* (2013.01); *H04N 1/00206* (2013.01); *H04N 1/00244* (2013.01); *H04N 1/00891* (2013.01); *H04N 1/32561* (2013.01); *H04N 1/32571* (2013.01); *G06F 3/1229* (2013.01); *H04L 63/02* (2013.01); *H04L 67/145* (2013.01); *H04N 2201/0094* (2013.01); *Y02D 10/1592* (2018.01)

(56) References Cited

U.S. PATENT DOCUMENTS

2013/0346145 A1* 12/2013 Sato ................. G06Q 20/085 705/7.29
2014/0297878 A1   10/2014 Minami et al.

FOREIGN PATENT DOCUMENTS

| JP | 2013-211842 A | 10/2013 | |
|---|---|---|---|
| JP | 2014-199998 A | 10/2014 | |
| WO | 2014/200631 A1 | 12/2014 | |
| WO | WO 2014200631 A1 * | 12/2014 | .......... H04W 76/045 |

OTHER PUBLICATIONS

Office Action dated May 9, 2017, issued by the Japanese Patent Office in corresponding Japanese Application No. 2015-062425 with partial English language translation (4 pages).

Office Action dated Oct. 3, 2017, issued by the Japanese Patent Office in corresponding Japanese Application No. 2015-062425 with English language translation (5 pages).

* cited by examiner

IMAGE PROCESSING SYSTEM, IMAGE PROCESSING APPARATUS, INSTRUCTION SERVER, AND STORAGE MEDIUM

This application is based on Japanese Patent Application No. 2015-062425 filed with the Japan Patent Office on Mar. 25, 2015, the entire content of which is hereby incorporated by reference.

BACKGROUND OF THE INVENTION

Field of the Invention

The present disclosure relates to an image processing system, an image processing apparatus, an instruction server, and a storage medium, and particularly relates to: an image processing system including an image processing apparatus and an instruction server which is configured to transmit instruction information to the image processing apparatus; an image processing apparatus and an instruction server which are constituent apparatuses of such an image processing system; and a storage medium storing a program executed by a processor of the image processing apparatus.

Description of the Related Art

In these years, an image processing apparatus such as MFP (Multi-Functional Peripheral) may receive instructions from an external apparatus such as instruction server. In this case, an image processing system including this image processing apparatus, for example, is provided with a session server (for example, XMPP (Extensible Messaging and Presence Protocol) server) for setting up a session between the image processing apparatus and the instruction server. The instruction server remotely gives an instruction to the image processing apparatus via the session server.

Regarding instructions remotely given to an apparatus, various techniques have been disclosed. For example, Japanese Laid-Open Patent Publication No. 2014-199998 discloses a communication system in which a server apparatus is provided between a remotely-controlled device and a remote control requesting device. The server apparatus includes: a first connecting unit configured to connect to both the remotely-controlled device and the remote control requesting device via a network, and establish a connection with the remote control requesting device; a connection maintaining unit configured to transmit, to the remote control requesting unit, a packet for maintaining the connection when a non-communication state of the connection continues for a predetermine time; and a disconnection detector configured to detect a packet stoppage state. When the disconnection detector detects the packet stoppage state, the connection maintaining unit shortens the "predetermined time."

According to the technique disclosed in Japanese Laid-Open Patent Publication No. 2014-199998, the time interval at which the packet for maintaining the session (connection) is transmitted is only shortened. Therefore, the number of times the packet is transmitted per unit time by the device which transmits the packet is only increased. Accordingly, the load on the device is only increased. Namely, in the case where the technique disclosed in Japanese Laid-Open Patent Publication No. 2014-199998 is applied to an image processing apparatus and the image processing apparatus transmits the packet for maintaining a session with the instruction server, the load on the image processing apparatus for maintaining the session could only be increased.

SUMMARY OF THE INVENTION

In view of the above circumstances, it is required to more reliably maintain a session between an image processing apparatus and an instruction server while keeping a minimum increase of the load on the Image processing apparatus.

According to an aspect of the present disclosure, there is provided an image processing system. The image processing system includes: an image processing apparatus; an instruction server configured to transmit instruction information to the image processing apparatus via a router having a firewall function; and a session server configured to set up a session between the image processing apparatus and the instruction server. The image processing apparatus includes a processor and a communication unit. The processor is configured to control a state of the image processing apparatus to be one of a plurality of states including a normal state and a power saving state in which a power consumption is smaller than a power consumption in the normal state. The communication unit is configured to transmit to the session server a connection confirmation packet for a session between the instruction server and the image processing apparatus. The processor is configured to adjust a transmission interval of the connection confirmation packet, based on a connection state of the session between the instruction server and the image processing apparatus after previous transmission of the connection confirmation packet, so that the transmission interval is within a session timeout period for the firewall function of the router. The processor is configured to switch the state of the image processing apparatus to a state in which the communication unit can at least transmit a packet, in a case where the state of the image processing apparatus is the power saving state when a time specified by the transmission interval elapses from previous transmission of the connection confirmation packet.

According to another aspect of the present disclosure, an image processing apparatus is provided. The image processing apparatus includes: a communication unit configured to receive instruction information from an instruction server via a router having a firewall function; and a processor configured to control a state of the image processing apparatus to be one of a plurality of states including a normal state and a power saving state in which a power consumption is smaller than a power consumption in the normal state. The communication unit is configured to transmit to a session server, which is configured to set up a session between the image processing apparatus and the instruction server, a connection confirmation packet for the session between the image processing apparatus and the instruction server. The processor is configured to adjust a transmission interval of the packet transmitted by the communication unit, based on a connection state of the session between the instruction server and the image processing apparatus after connection confirmation, so that the transmission interval is within a session timeout period for the firewall function of the router. The processor is configured to switch the state of the image processing apparatus to a state in which the communication unit can at least transmit a packet, in a case where the state of the image processing apparatus is the power saving state when a time specified by the transmission interval elapses from transmission of the packet.

According to still another aspect of the present disclosure, there is provided a non-transitory computer-readable storage medium storing a program executed by a processor of an image processing apparatus configured to receive instruction information from an instruction server via a router having a firewall function. The program causes the processor to execute the steps of controlling a state of the image processing apparatus to be one of a plurality of states including a normal state and a power saving state in which a power consumption is smaller than a power consumption in the normal state; transmitting, to a session server configured to set up a session between the image processing apparatus and the instruction server, a connection confirmation packet for the session between the image processing apparatus and the instruction server; adjusting a transmission interval of the connection confirmation packet, based on a connection state of the session between the instruction server and the image processing apparatus after connection confirmation, so that the transmission interval is within a session timeout period for the firewall function of the router; and switching the state of the image processing apparatus to a state in which at least the connection confirmation packet can be transmitted, in a case where the state of the image processing apparatus is the power saving state when a time specified by the transmission interval elapses from transmission of the connection confirmation packet.

According to a further aspect of the present disclosure, there is provided an instruction server configured to transmit instruction information to an image processing apparatus via a router having a firewall function. The instruction server includes: a communication unit configured to transmit to a session server, which is configured to set up a session between the image processing apparatus and the instruction server, a connection confirmation packet for a session between the image processing apparatus and the instruction server; and a processor configured to adjust a transmission interval of the packet transmitted by the communication unit, based on a connection state of the session between the instruction server and the image processing apparatus after connection confirmation, so that the transmission interval is within a session timeout period for the firewall function of the router.

The foregoing and other objects, features, aspects and advantages of the present invention will become more apparent from the following detailed description of the present invention when taken in conjunction with the accompanying drawings.

DESCRIPTION OF THE PREFERRED EMBODIMENTS

Figure 1:
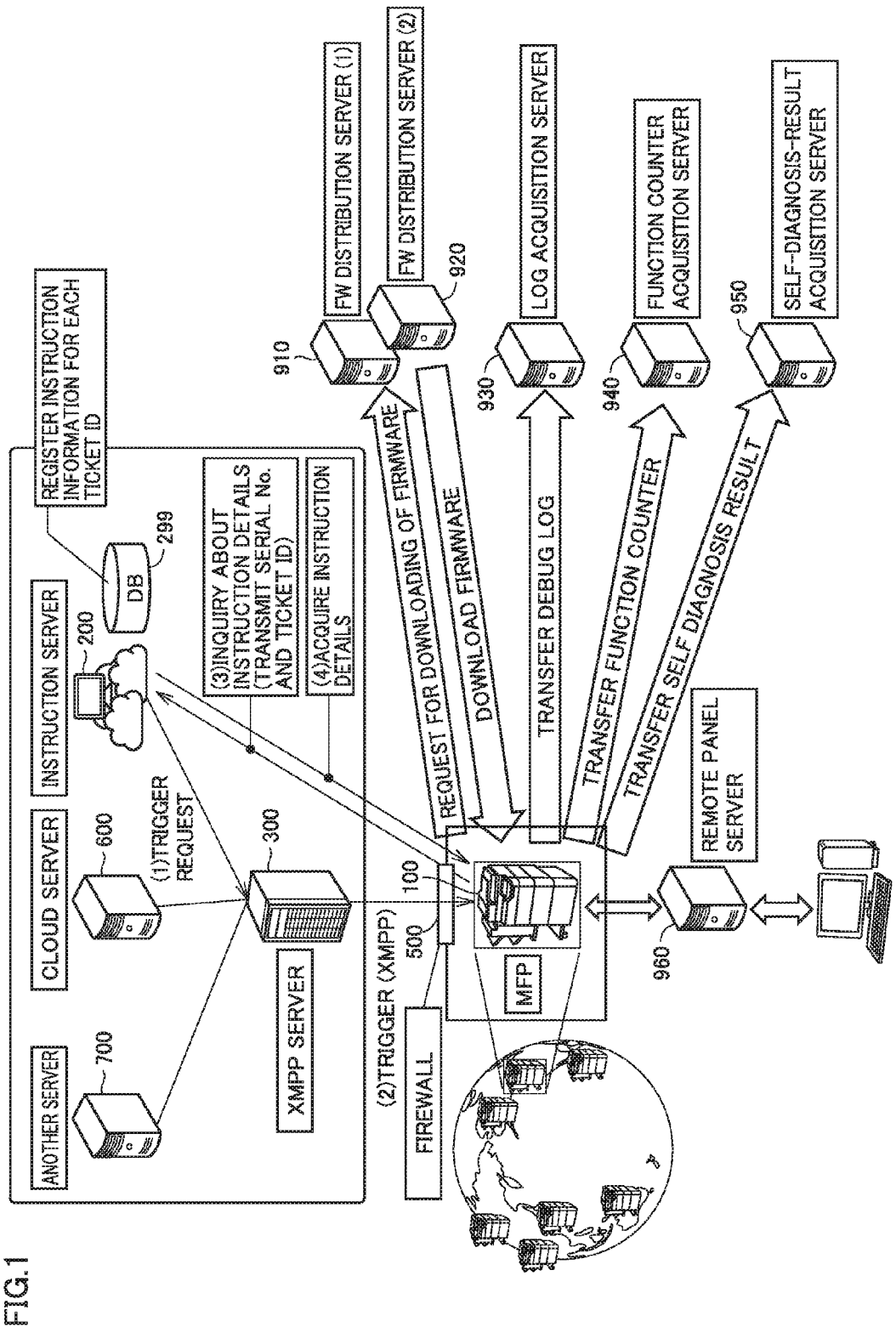
FIG. 1 is a diagram showing an example of a configuration of an image processing system in a first embodiment.

In the following, embodiments of an image processing system will be described with reference to the drawings. In the following description, the same components and the same elements are denoted by the same reference characters. They are named identically and function identically. Therefore, a description of them will not be repeated herein.

First Embodiment

1. Configuration of Image Processing System

FIG. 1 is a diagram showing an example of a configuration of an image processing system in a first embodiment of the present disclosure.

As shown in FIG. 1, the image processing system includes an MFP 100 which is an example of an image processing apparatus. MFP 100 communicates with an XMPP (Extensible Messaging and Presence Protocol) server 300 via a router 500 having a firewall function. MFP 100 communicates with various servers (a cloud server 600 and a server 700) including an instruction server 200, via XMPP server 300. Instruction server 200 is a server configured to transmit instruction information to MFP 100. Instruction server 200 is an exemplary instruction server.

MFP 100 performs a process for establishing an XMPP session continuously with instruction server 200 so that MFP 100 can receive instruction information all the time from instruction server 200. More specifically, MFP 100 transmits to XMPP server 300 a packet for establishing a session with the instruction server.

For MFP 100, the packet transmission interval at which the packet is transmitted by the MFP is appropriately adjusted so that the interval is within a timeout period of the firewall function of router 500. Namely, for MFP 100, the packet transmission interval is shortened or extended as appropriate so that the interval is within the timeout period.

When MFP 100 receives instruction information from instruction server 200, MFP 100 uses a group of servers provided separately from the aforementioned servers to implement a function specified by the instruction information. The group of servers includes a firmware distribution server (1) 910, a firmware distribution server (2) 920, a log acquisition server 930, a function counter acquisition server 940, a self-diagnosis-result acquisition server 950, and a remote panel server 960. The functions executed by MFP 100 using the group of servers will be described later herein (fourth embodiment).

Transmission of the instruction information from instruction server 200 to MFP 100 is illustrated in FIG. 1 following the arrows indicated by (1) to (4). Namely, as indicated by the arrow (1), firstly instruction server 200 makes a trigger request to XMPP server 300 for transmission of instruction information.

In response to the request indicated by arrow (1), XMPP server 300 transmits a trigger signal to MFP 100 as indicated by the arrow (2).

In response to the trigger signal indicated by the arrow (2), MFP 100 issues an inquiry to instruction server 200 about the instruction information as indicated by the arrow (3). The inquiry is made in accordance with a protocol different from XMPP, such as HTTP. Together with the inquiry, a serial number and a ticket ID are transmitted from MFP 100 to instruction server 200.

In response to the inquiry indicated by the arrow (3), instruction server 200 transmits the instruction information to MFP 100 as indicated by the arrow (4). Receiving the instruction information, MFP 100 executes a process for implementing a function specified by the instruction information. An example of the function is downloading of specific firmware from firmware distribution server (1) 910.

2. Hardware Configuration of MFP

Figure 2:
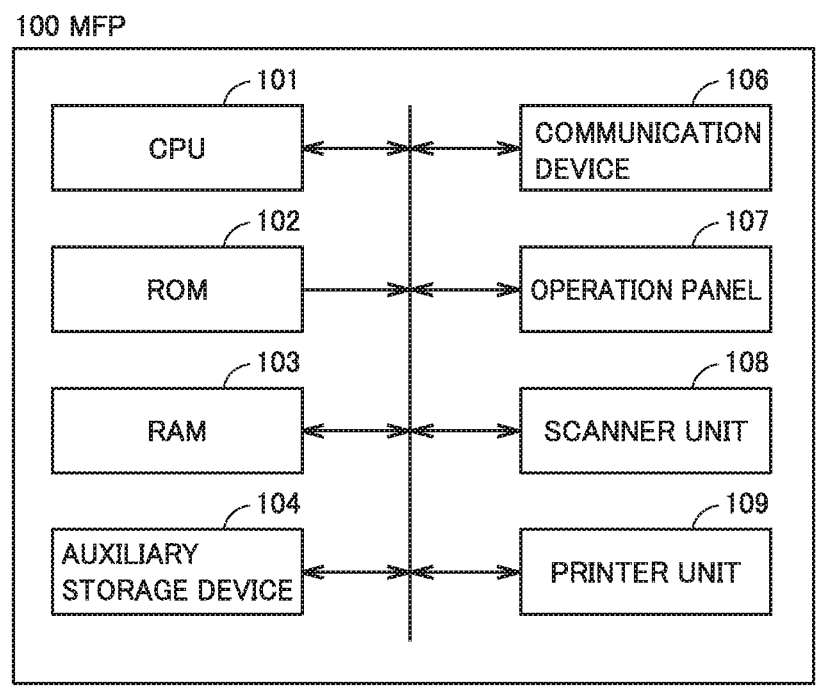
FIG. 2 is a diagram showing an example of a hardware configuration of an MFP included in the image processing system in the first embodiment.

FIG. 2 is a diagram showing an example of a hardware configuration of MFP 100 included in the image processing system in the first embodiment.

As shown in FIG. 2, MFP 100 includes, as its main components, a CPU 101, a ROM (Read Only Memory) 102, a RAM (Random Access Memory) 103, an auxiliary storage device 104, a communication device 106, an operation panel 107, a scanner unit 108, and a printer unit 109. CPU 101, ROM 102, RAM 103, auxiliary storage device 104, communication device 106, operation panel 107, scanner unit 108, and printer unit 109 are connected to one another through an internal bus.

CPU 101 is an example of a processor executing a process for overall control of the operation of MFP 100.

ROM 102 stores various kinds of data including a program to be executed by CPU 101.

RAM 103 functions as a work area when CPU 101 executes a program. In some cases, RAM 103 may temporarily store image data or the like read by scanner unit 108.

Auxiliary storage device 104 stores various kinds of data such as address information and/or documents registered in MFP 100. The document data may be input via a network to MFP 100, or may be generated from an image read by scanner unit 108.

Communication device 106 is a communication interface which functions when MFP 100 transmits/receives information to/from other devices. In the image processing system in the first embodiment, an example of the communication technology for communication device 106 is Bluetooth (registered trademark). The communication technology may be any of other wireless communication technologies or wired communication technologies.

Operation panel 107 receives input of various kinds of information such as set value for the copy image quality or the copy sheet, and information for registering or selecting a destination of scanning (address information). The surface of operation panel 107 is provided with a liquid crystal display unit in which a touch panel is disposed, for example. Operation panel 107 displays details setting for MFP 100 for example.

Scanner unit 108 scans a set original to generate image data of the original. Since a known method may be employed for generation of the image data by scanner unit 108, a detailed description thereof is not be given here.

By means of electrophotography, for example, printer unit 109 converts image data read by scanner unit 108 or converts print data which is transmitted from an external image processing apparatus such as instruction server (WWW server) 200, into data suitable for printing, and then prints the image such as document, based on the converted data. For this printing, any known technique may be employed.

CPU 101 may execute an appropriate program to implement the operation of MFP 100 as disclosed herein. An example of the storage location of the program executed by CPU 101 is ROM 102. Another example thereof is auxiliary storage device 104. Still another example thereof is a storage medium attachable to and removable from MFP 100. The storage medium refers to a medium which stores data in a nonvolatile manner, such as CD-ROM (Compact Disc-Read Only Memory), DVD-ROM (Digital Versatile Disk-Read Only Memory), USB (Universal Serial Bus) memory, memory card, FD (Flexible Disk), hard disk, SSD (Solid State Drive), magnetic tape, cassette tape, MO (Magnetic Optical Disc), MD (Mini Disc), IC (integrated Circuit) card (excluding memory card), optical card, mask ROM, EPROM, EEPROM (Electronically Erasable Programmable Read-Only Memory), for example.

The program in the present disclosure may be a program causing necessary program modules, among program modules provided as a part of an operating system (OS) of a computer, to be called in a predetermined order and at a predetermined timing, to execute a process. In this case, the program itself does not include the aforementioned modules, and the program is executed in cooperation with the OS. Such a program including no module may also be included in the program of the present disclosure.

The program of the present disclosure may also be incorporated in a part of the other program, and accordingly provided. In this case as well, the program itself does not include modules which are included in the aforementioned other program, and the process is executed in cooperation with the other program. Such a program incorporated in the other program may also be included in the program of the present disclosure.

A program product to be provided is installed in a program storage unit such as hard disk and executed. The program product includes a program itself and a recording medium on which the program is recorded.

3. Functional Configuration of MFP 100

Figure 3:
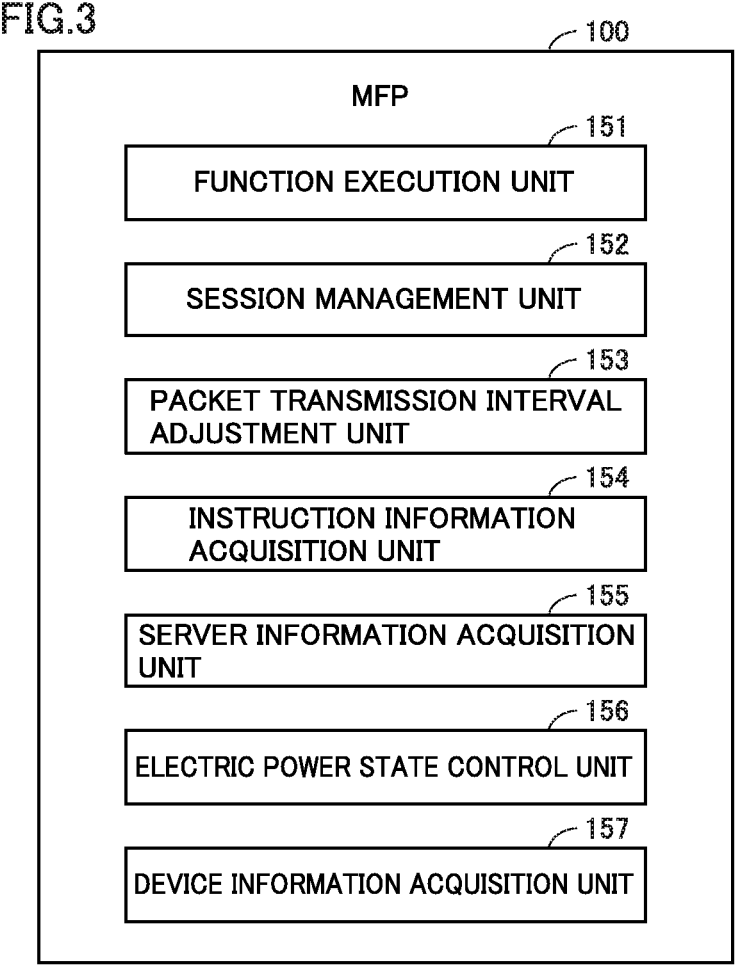
FIG. 3 is a diagram showing a functional configuration of the MFP.

FIG. 3 is a diagram showing a functional configuration of MFP 100. Each function of MFP 100 shown in FIG. 3 is implemented through execution of an appropriate program by CPU 101, for example.

As shown in FIG. 3, MFP 100 includes a function execution unit 151, a session management unit 152, a packet transmission interval adjustment unit 153, an instruction information acquisition unit 154, a server information acquisition unit 155, an electric power state control unit 156, and a device information acquisition unit 157.

Function execution unit 151 executes a process for implementing a function specified by instruction information from instruction server 200. For example, when the function is downloading of firmware, CPU 101 transmits data for requesting transmission of firmware, to a server which is a destination of the firmware specified by the instruction information.

Session management unit 152 manages establishment of a session with instruction server 200, for example. More specifically, in order to continue establishment of the session, for example, CPU 101 transmits a packet necessary for establishment of the session, at a predetermined packet transmission interval to XMPP server 300.

Packet transmission interval adjustment unit 153 adjusts the aforementioned packet transmission interval. More specifically, packet transmission interval adjustment unit 153 transmits the packet and also determines whether or not a session with instruction server 200 is established. This determination is made based on for example whether or not a reply to the packet transmission is given from instruction server 200. In an example of control executed by packet transmission interval adjustment unit 153, the transmission interval is extended when it is determined that a session is established, and the transmission interval is shortened when it is determined that the session is disconnected.

Instruction information acquisition unit 154 executes a process for acquiring instruction information from instruction server 200. More specifically, receiving a trigger from XMPP server 300 as described above with reference to FIG. 1, instruction information acquisition unit 154 issues an inquiry to instruction server 200 about instruction information (arrow (3) in FIG. 1).

Server information acquisition unit 155 acquires information about whether or not a server can be used for executing a function which is necessary for a function specified by the instruction information from instruction server 200. More specifically, as described above with reference to FIG. 1, the function specified by the instruction information from instruction server 200 includes a function which requires at least one server in the server group (firmware distribution server (1) 910, firmware distribution server (2) 920, log acquisition server 930, function counter acquisition server 940, self-diagnosis-result acquisition server 950, and remote panel server 960). Server information acquisition unit 155 issues an inquiry to instruction server 200 about whether or not a server is available that is required by the function specified by the instruction information from instruction server 200.

Electric power state control unit 156 controls the state of electric power of MFP 100. For MFP 100, a plurality of states are set as states of electric power of MFP 100, including a normal electric power state in which electric power is supplied to enable all components in MFP 100 to operate, and a power-saving state in which the power consumption is smaller than that of the normal electric power state. Electric power state control unit 156 controls the state of electric power assumed by MFP 100. For example, electric power state control unit 156 sets MFP 100 to the normal electric power state when MFP 100 is activated. When no instruction is input for a certain time to operation panel 107, electric power state control unit 156 switches the normal electric power state to the power saving state. Further, based on schedule information stored in auxiliary storage device 104, electric power state control unit 156 controls the state of electric power of MFP 100. An example of the schedule information is weekly timer. Based on the weekly timer, the state of electric power of MFP 100 may be switched to the power saving state when no operational instruction is given to operation panel 107 in a specific time frame on a specific day in a week. Based on the weekly timer, the state of electric power of MFP 100 may be kept in the normal electric power state in a specific time frame on a specific day in a week.

Device information acquisition unit 157 executes a process for acquiring information about MFP 100, such as log and/or TEC value. The acquired information is stored for example in auxiliary storage device 104.

4. Hardware Configuration of Instruction Server

Figure 4:
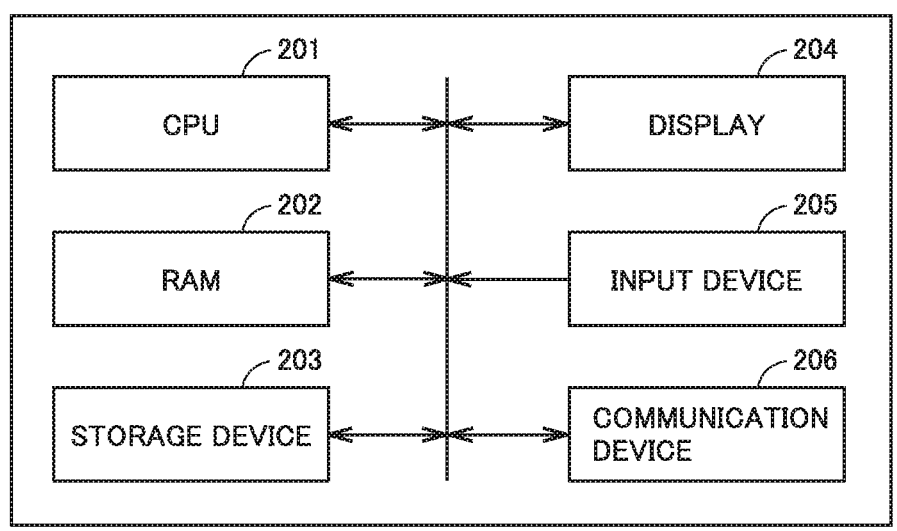
FIG. 4 is a diagram showing a hardware configuration of an instruction server.

FIG. 4 is a diagram showing a hardware configuration of instruction server 200.

Instruction server 200 includes, as its main components, a CPU 201, a RAM 202, a storage device 203, a display 204, an input device 205, and a communication device 206. CPU 201, RAM 202, storage device 203, display 204, input device 205, and communication device 206 are connected to one another through an internal bus.

CPU 201 is an example of a processor executing a process for controlling the overall operation of instruction server 200.

RAM 202 functions as a work area when CPU 201 executes a process.

Storage device 203 stores various kinds of data including a file of various programs such as server application program executed by CPU 201, and data used for execution of these programs. Storage device 203 is a medium which stores data in a nonvolatile manner, such as CD-ROM, DVD-ROM, USB memory, memory card, FD, hard disk, SSD, magnetic tape, cassette tape, MO, MD, IC card (excluding memory card), optical card, mask ROM, EPROM, EEPROM, for example. In storage device 203, a program which is downloaded via a network may also be installed.

Display 204 is a display device for displaying an image indicating the result of processing of a program executed by CPU 201.

Input device 205 is implemented by buttons, a keyboard, a touch sensor, or the like, for entering various instructions to CPU 201.

Communication device 206 is a communication interface which functions when instruction server 200 transmits/receives information to/from other devices such as MFP 100.

5. Packet Transmission for Maintaining Session

Figure 5:
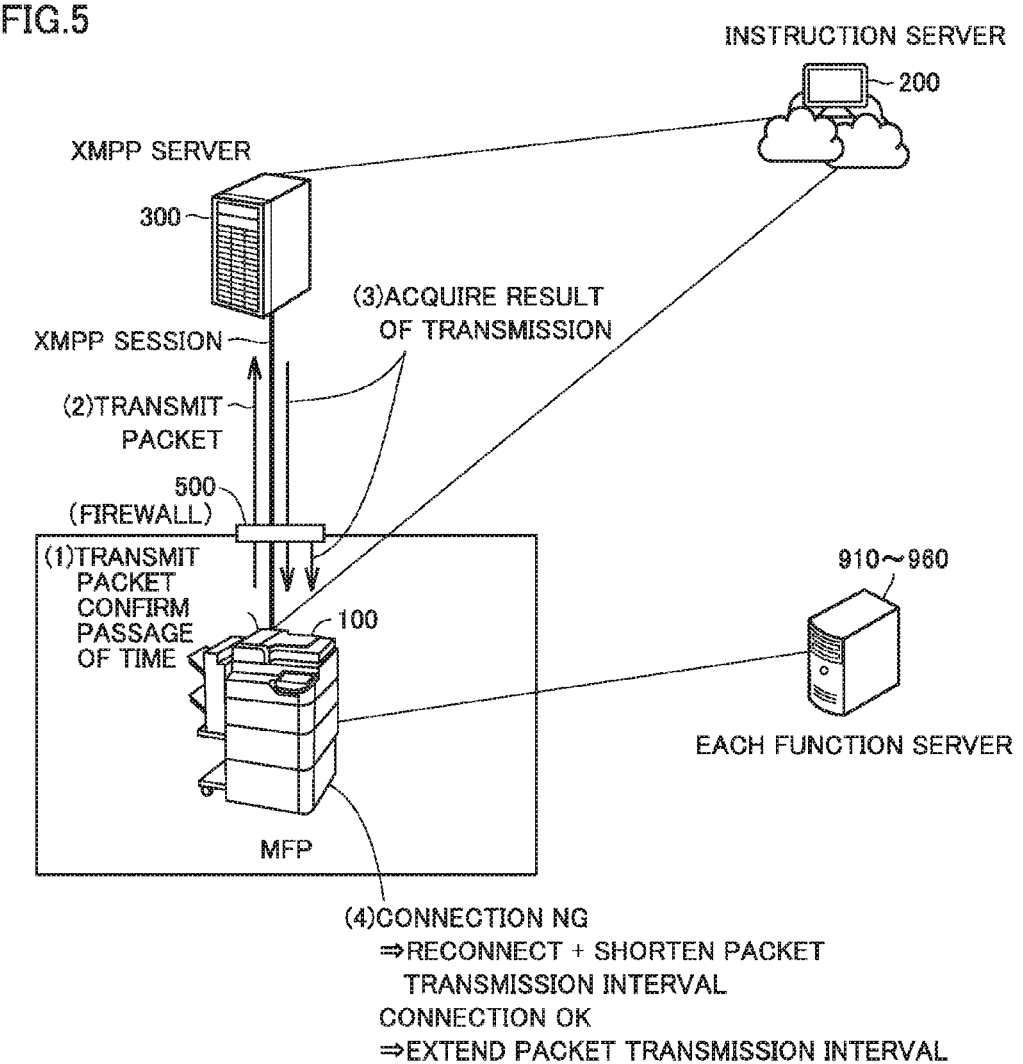
FIG. 5 is a diagram for illustrating packet transmission by the MFP for maintaining a session with the instruction server.

FIG. 5 is a diagram for illustrating packet transmission by MFP 100 for maintaining a session with instruction server 200. As shown in FIG. 5, a process regarding packet transmission from MFP 100 to XMPP server 300 includes the steps indicated by (1) to (4).

In the step indicated by (1), MFP 100 transmits to router 500 a packet which is addressed to XMPP server 300. The packet is a packet for maintaining a session between MFP 100 and instruction server 200. This packet is transmitted at a given time interval. The time interval is also referred to as "packet transmission interval" herein.

In the step indicated by (2), router 500 transmits the packet to XMPP server 300 in response to the aforementioned transmission of the packet from MFP 100 as indicated by (1).

In the step indicated by (3), XMPP server 300 transmits to router 500 the result of packet transmission indicated by (2). This result indicates whether the session between MFP 100 and instruction server 200 is maintained or disconnected. After this, router 500 transmits to MFP 100 the result acquired from XMPP server 300.

In the step indicated by (4), MFP 100 performs a process depending on the result acquired from router 500. More specifically, in the case where the result acquired from router 500 indicates the fact that "the session is maintained," MFP 100 extends the aforementioned "packet transmission interval" ("EXTEND PACKET TRANSMISSION INTERVAL" in FIG. 5), for example. In contrast, in the case where the result acquired from router 500 indicates the fact that "the session is disconnected," MFP 100 transmits via router 500 to XMPP server 300 information for newly establishing a session with instruction server 200 and further shortens the aforementioned "packet transmission interval" ("SHORTEN PACKET TRANSMISSION INTERVAL" in FIG. 5), for example.

6. Process Overview

Figure 6:
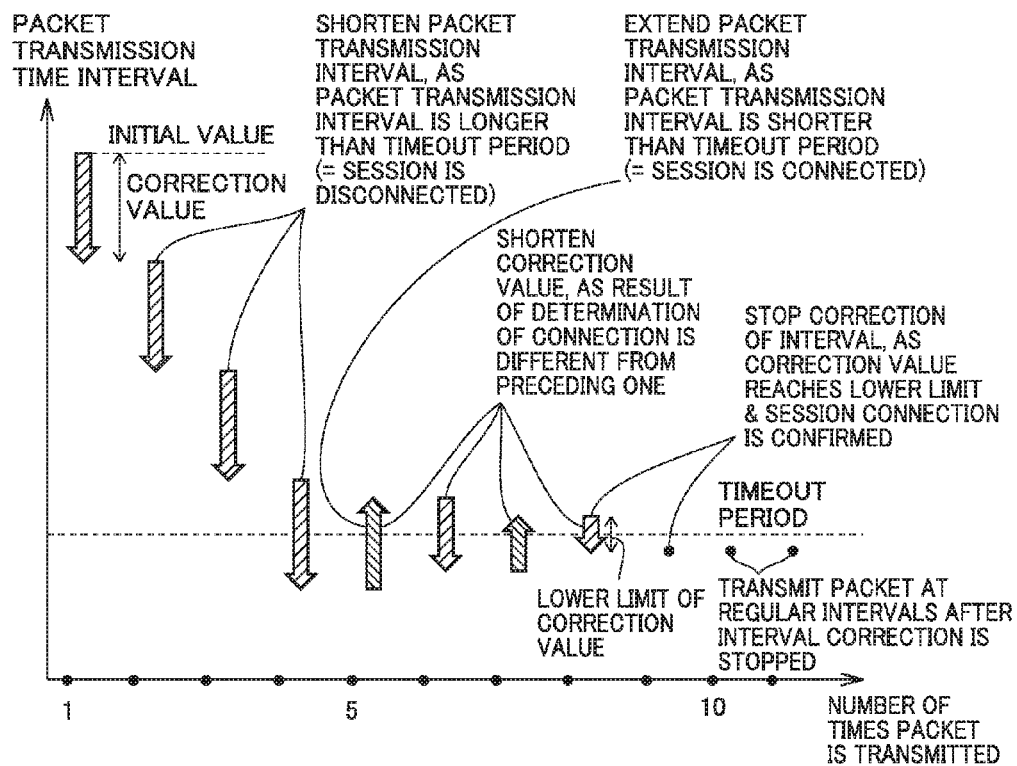
FIG. 6 is a diagram showing a state in which an initial value of a packet transmission interval which is set for the MFP is longer than a timeout period for a firewall function of a router.
Figure 7:
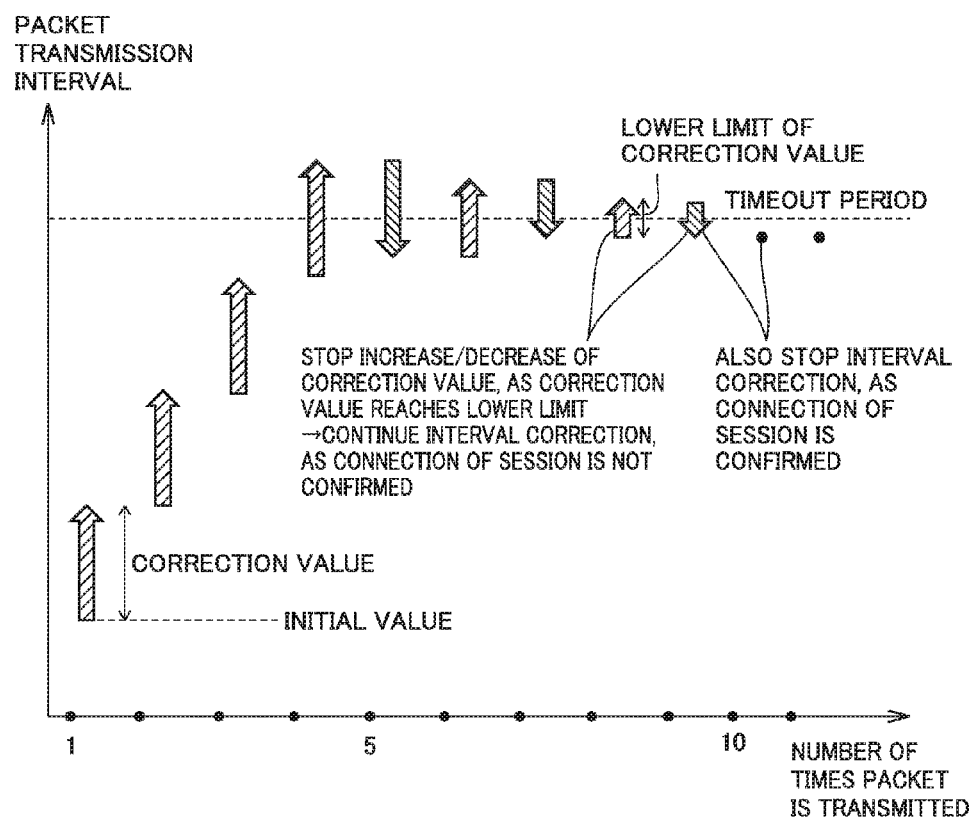
FIG. 7 is a diagram showing a state in which an initial value of a packet transmission interval which is set for the MFP is shorter than a timeout period for a firewall function of a router.
Figure 8:
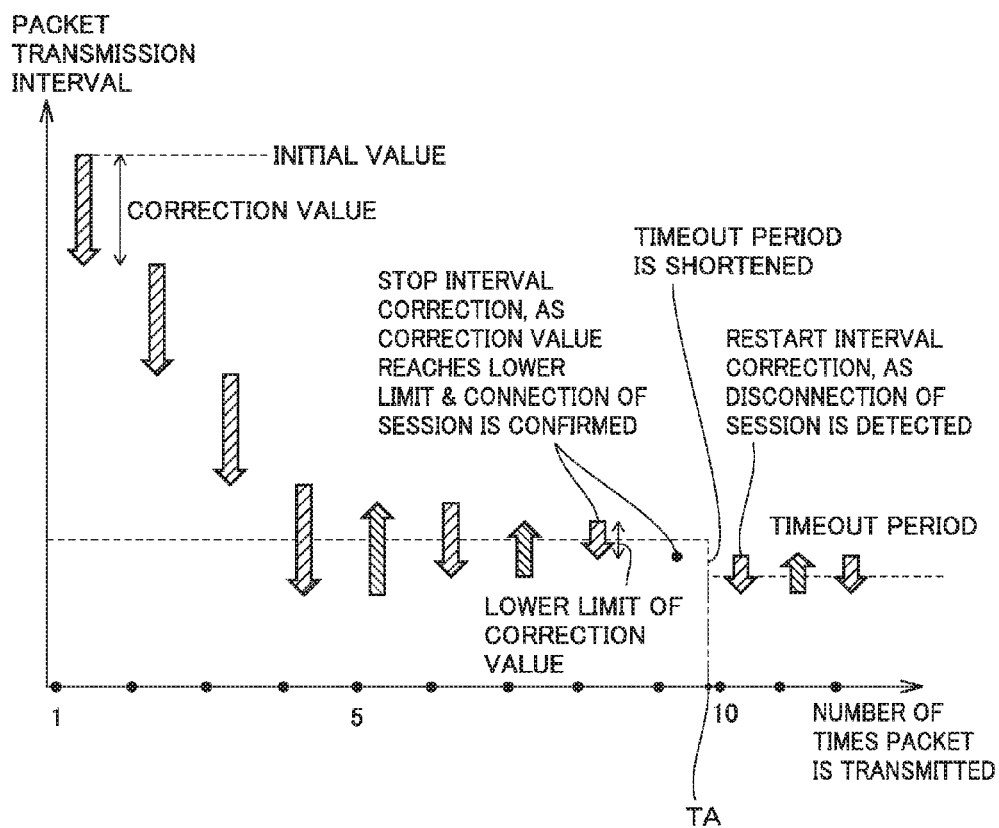
FIG. 8 is a diagram for illustrating an overview of a process executed by the MFP in the first embodiment for adjusting "packet transmission interval."

FIGS. 6 to 8 are each a diagram for illustrating an overview of a process executed by MFP 100 in the first embodiment for adjusting the aforementioned "packet transmission interval." In FIGS. 6 to 8, change of the packet transmission interval after packet transmission is indicated by a hatched arrow (referred to simply as "arrow" hereinafter). More specifically, a downward arrow represents shortening of the packet transmission interval and an upward arrow represents extension of the packet transmission interval.

Referring first to FIG. 6, a manner of adjusting "packet transmission interval" will be described. FIG. 6 shows a case where the initial value of the packet transmission interval which is set for MFP 100 is longer than the timeout period for the firewall function of router 500.

In the graph of FIG. 6, the vertical axis represents the packet transmission interval and the horizontal axis represents the number of times the packet is transmitted. In FIG. 6, the initial value of the packet transmission interval for MFP 100 is represented by a broken line and the timeout period for the firewall function of router 500 is indicated by a broken line. In the example shown in FIG. 6, the initial value of the packet transmission interval is longer than the timeout period of router 500. In MFP 100, control is executed to make the packet transmission interval closer to the timeout period of router 500 and shorter than the timeout period. In the following, this control will more specifically be described.

The leftmost arrow (downward) shown in FIG. 6 indicates that the packet transmission interval is shortened after the first packet transmission by MFP 100. The length of time by which the packet transmission interval is shortened is "correction value" for the packet transmission interval and corresponds to a predetermined value for MFP 100. As seen from FIG. 6, the initial value of the packet transmission interval is longer than the timeout period of router 500. Therefore, there is a high possibility that the result of the first packet transmission indicates that the session between MFP 100 and instruction server 200 is disconnected. In the case where the result of the packet transmission indicates that the session is disconnected, MFP 100 shortens the packet transmission interval and instructs router 500 to establish a session with instruction server 200.

The second leftmost arrow (downward) in FIG. 6 indicates that the packet transmission interval is further shortened by the aforementioned "correction value" after the second packet transmission. As seen from FIG. 6, the packet transmission interval when the second packet transmission is done is still longer than the timeout period of router 500. In the case where the result of the second packet transmission indicates that the session is disconnected, MFP 100 shortens the packet transmission interval and instructs router 500 to establish a session with instruction server 200.

The third arrow and the fourth arrow (both downward) from the leftmost one in FIG. 6 indicate that the packet transmission interval is further shortened by the "correction value" after the third packet transmission and the fourth packet transmission, respectively. As seen from FIG. 6, the packet transmission interval when the third packet transmission and the fourth packet transmission are done is still longer than the timeout period of router 500. In the case where respective results of the third packet transmission and the fourth packet transmission each indicate that the session is disconnected, MFP 100 shortens the packet transmission interval and instructs router 500 to establish a session with instruction server 200.

The fifth arrow upward) from the leftmost one in FIG. 6 indicates that the packet transmission interval is extended after the fifth packet transmission. As seen from FIG. 6, the shortening of the packet transmission interval after the fourth packet transmission causes the packet transmission interval to be shorter than the timeout period. Accordingly, the result of the fifth packet transmission may indicate that the session is maintained. In the case where the result of the fifth packet transmission indicates that the session is maintained, MFP 100 only extends the packet transmission interval. Namely, it is unnecessary for MFP 100 at this time to instruct router 500 to establish a session with instruction server 200. The length of time by which the interval is extended is smaller than the foregoing correction value. In the case where the result of the present packet transmission is different from the result of the preceding packet transmission, the correction value for the latest packet transmission interval for MFP 100 may be smaller. In the case where the result of the fourth packet transmission is "session is disconnected" and the result of the fifth packet transmission is "session is maintained," the correction value for the packet transmission interval after the fifth packet transmission is smaller than the correction value for the packet transmission interval after the fourth packet transmission.

The sixth arrow (downward) from the leftmost one in FIG. 6 indicates that the packet transmission interval is shortened after the sixth packet transmission. As seen from FIG. 6, the extension of the packet transmission interval after the fifth packet transmission causes the packet transmission interval to be longer than the timeout period. Accordingly, the result of the sixth packet transmission is "session is disconnected." In contrast, the result of the fifth packet transmission is "session is maintained." Namely, the result of the sixth packet transmission is different from the result of the fifth packet transmission. Therefore, the correction value for the packet transmission interval after the sixth packet transmission is smaller than the correction value for the packet transmission interval after the fifth packet transmission.

The seventh arrow (upward) from the leftmost one in FIG. 6 indicates that the packet transmission interval is extended after the seventh packet transmission. Since the result of the seventh packet transmission (session is maintained) differs from the result of the sixth packet transmission (session is disconnected), the correction value for the packet transmission interval after the seventh packet transmission is smaller than the correction value for the packet transmission interval after the sixth packet transmission.

The eighth arrow (downward) from the leftmost one in FIG. 6 indicates that the packet transmission interval is shortened after the eighth packet transmission. Since the result of the eighth packet transmission (session is disconnected) differs from the result of the seventh packet transmission (session is maintained), the correction value for the packet transmission interval after the eighth packet transmission is smaller than the correction value for the packet transmission interval after the seventh packet transmission.

After the ninth packet transmission, the packet transmission interval is not changed. This is for the reason that the shortening of the packet transmission interval after the eighth packet transmission causes the correction value for the packet transmission interval to reach a predetermined lower limit and that the result of the eighth packet transmission is "session is maintained." In the case where the correction value for the packet transmission interval (either extended or shortened) reaches the lower limit and the result of the following packet transmission is "session is maintained," the correction value for the packet transmission interval will not be changed any more. It is assumed that, in this state, the packet transmission interval of MFP 100 is close to the timeout period of the router and equal to or shorter than the timeout period.

Referring next to FIG. 7, another manner of adjusting "packet transmission interval" will be described. FIG. 7 shows a case where the initial value of the packet transmission interval which is set for MFP 100 is shorter than the timeout period for the firewall function of router 500.

The leftmost arrow (upward) in FIG. 7 indicates that the packet transmission interval is extended by "correction value" after the first packet transmission.

The second to fourth arrows (all upward) from the leftmost one in FIG. 7 indicate that the packet transmission interval is extended by "correction value" after the second packet transmission to the fourth packet transmission, respectively.

The fifth arrow (downward) from the leftmost one in FIG. 7 indicates that the packet transmission interval is shortened after the fifth packet transmission. The "correction value" by which the interval is shortened is smaller than the "correction value" by which the packet transmission interval is extended after the first packet transmission to the fourth packet transmission. This is for the reason that the result of the fifth packet transmission (session is disconnected) differs from the result of the fourth packet transmission (session is maintained).

The sixth to ninth arrows (upward, downward, upward, and downward, respectively) from the leftmost one in FIG. 7 indicate that the packet transmission interval is corrected (extended, shortened, extended, and shortened, respectively) after the sixth packet transmission to the ninth packet transmission, respectively.

In the example shown in FIG. 7, the shortening of the packet transmission interval after the ninth packet transmission causes the correction value to reach the lower limit, and the result of the ninth packet transmission indicates that the session is maintained. Accordingly, in this example, even when the packet transmission interval is changed after the tenth packet transmission, the correction value for the changed packet transmission interval is not changed.

In the example shown in FIG. 7, in the case where the initial value of the packet transmission interval is considerably shorter than the timeout period of router 500, the packet transmission interval is adjusted to be closer to the timeout period and within the timeout period.

In an example shown in FIG. 8, the timeout period for the firewall function of router 500 is shortened at the time indicated by "TA."

More specifically, in the example shown in FIG. 8, the packet transmission interval is changed similarly to the example shown in FIG. 6 until the time indicated by "TA" is reached. As the packet transmission interval is changed and the timeout period of router 500 is shortened, the result of the packet transmission is "the session between MFP 100 and instruction server 200 is disconnected" and accordingly the packet transmission interval is shortened as indicated by the third arrow (downward) from the rightmost one in FIG. 8. At this time, the packet transmission interval is shortened by a predetermined "lower limit."

In the example shown in FIG. 8, after the packet transmission interval is changed by this lower limit, the packet transmission interval is further changed twice before the result of packet transmission indicates "session is maintained." The change made twice is indicated by the second rightmost arrow (upward) and the rightmost arrow (downward) in FIG. 8.

7. Process Flow

FIGS. 9 to 12 slow a flowchart of a process executed for packet transmission by MFP 100 in the first embodiment.

Figure 9:
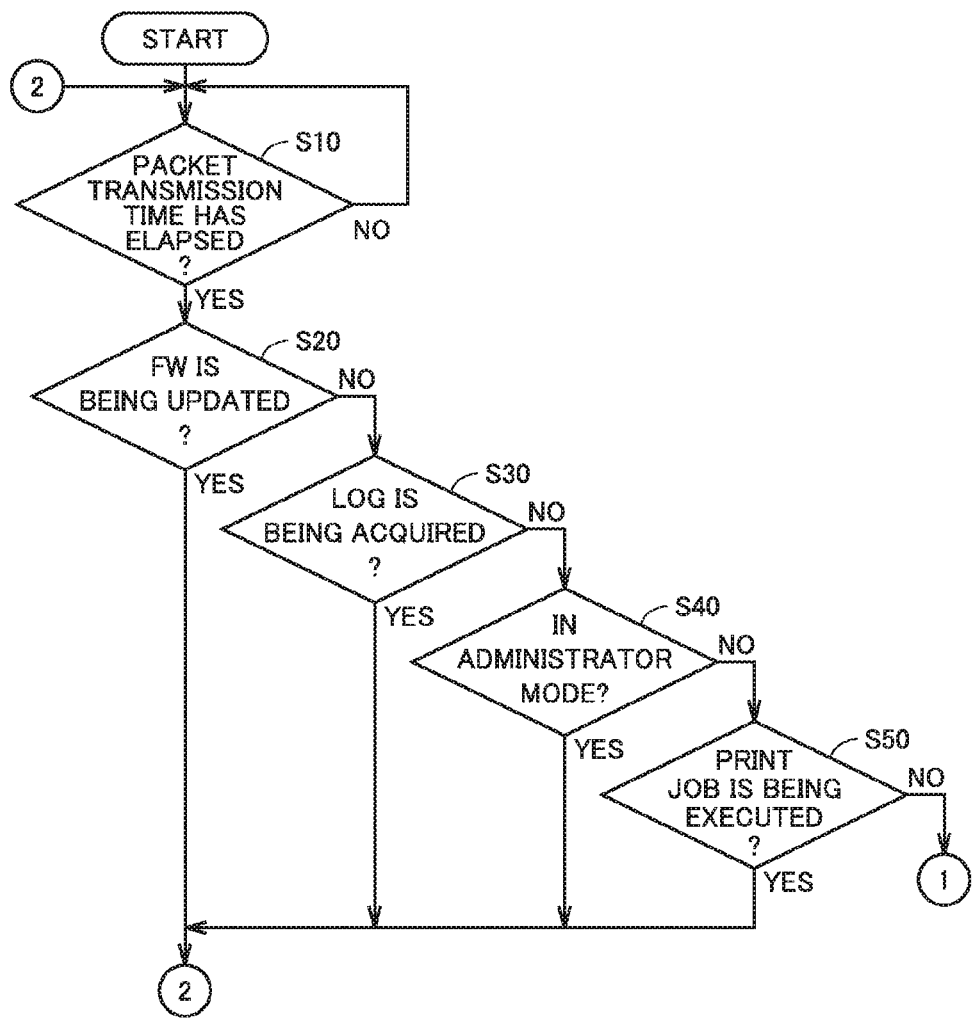
FIGS. 9 to 12 show a flowchart of a process executed for packet transmission by the MFP in the first embodiment.

Referring first to FIG. 9, CPU 101 of MFP 100 determines in step S10 whether or not "packet transmission interval" has elapsed since the preceding packet transmission. After this, the control by CPU 101 remains in step S10 (NO in step S10) until CPU 101 determines that "packet transmission interval" has elapsed. When CPU 101 determines that "packet transmission interval" has elapsed (YES in S10), the control by CPU 101 proceeds to step S20. When the "packet transmission interval" has elapsed, the control proceeds to step S20 as well, even if the packet has not been transmitted yet.

In step S20, CPU 101 determines whether or not a CPU of MFP 100 (in the case where another CPU is mounted in MFP 100 in addition to CPU 101, the aforementioned CPU is CPU 101 or the other CPU, which is applied as well to the following steps S30 to S50) is performing an update process for firmware (hereinafter also referred to as "FW") of MFP 100. When CPU 101 determines that the FW is being updated (YES in step S20), the control by CPU 101 returns to step S10. In contrast, when CPU 101 determines that the FW is not being updated (NO in step S20), the control proceeds to step S30.

In step S30, CPU 101 determines whether or not the CPU of MFP 100 is performing a process for acquiring a log of MFP 100. When CPU 101 determines that a log is being acquired (YES in step S30), the control by CPU 101 returns to step S10. In contrast, when CPU 101 determines that a log is not being acquired (NO in step S30), the control proceeds to step S40.

In step S40, CPU 101 determines whether or not the CPU of MFP 100 is performing control in an administrator mode. The administrator mode refers to a state in MFP 100 in which an administrator logs in. As an ID and a password for the administrator for example are input, the CPU of MFP 100 executes the control in the administrator mode. Under the control in the administrator mode, a special function for the administrator is performed. The special function includes for example reception of operation which is done for changing settings for MFP 100 (details which may be provided regarding the upper limit of the number of sheets to be printed by MFP 100 or regarding image processing by MFP 100, for example (color printing, display/output of confidential document)). When CPU 101 determines that the administrator mode is being performed (YES in step S40), the control by CPU 101 returns to step S10. In contrast, when CPU 101 determines that the administrator mode is not being performed (NO in step S40), the control proceeds to step S50.

Figure 10:
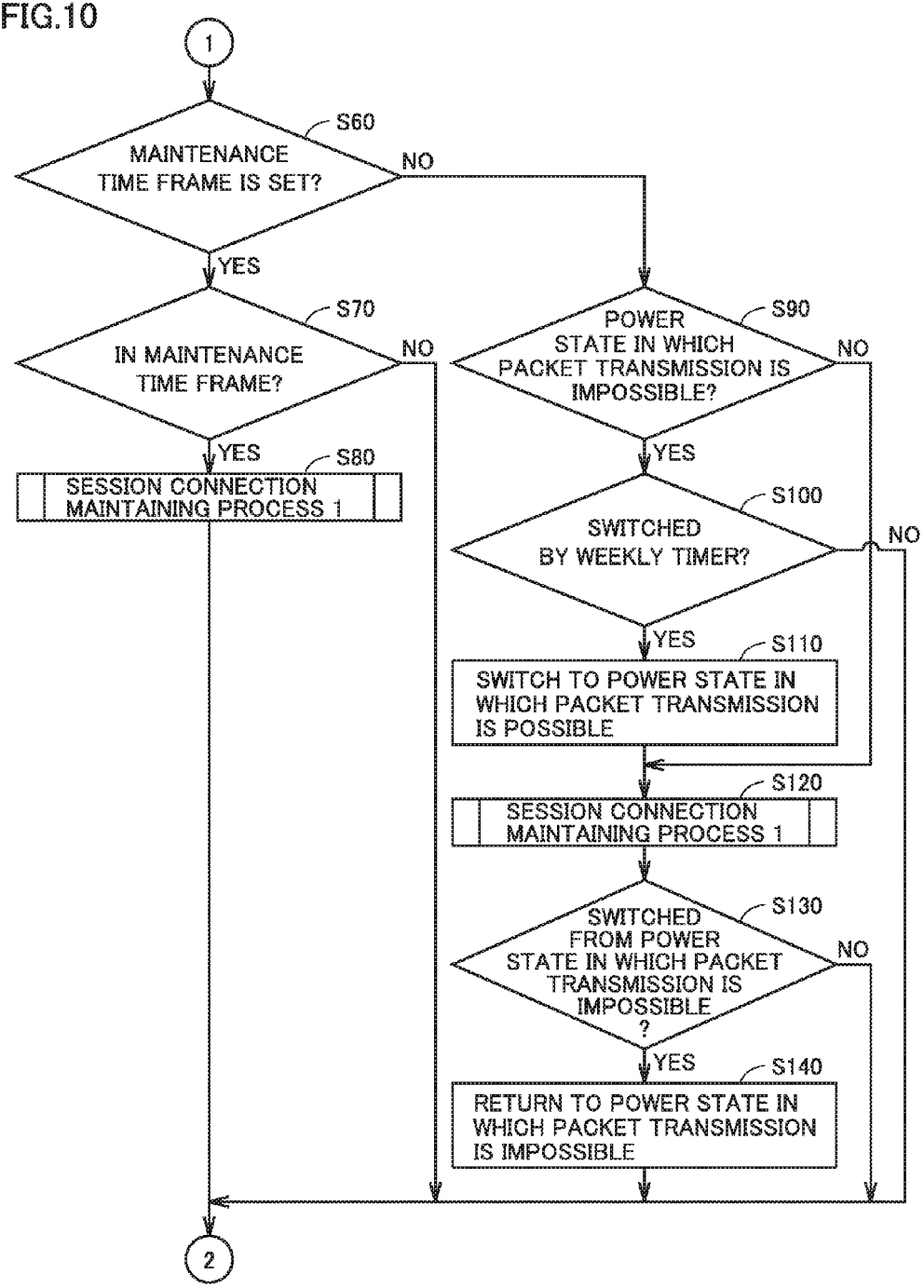

In step S50, CPU 101 determines whether or not MFP 100 at this time is performing a print job. When CPU 101 determines that MFP 100 is performing a print job (YES in step S50), the control by CPU 101 returns to step S10. In contrast, when CPU 101 determines that MFP 100 is not performing a print job (NO in step S50), the control proceeds to step S60 (FIG. 10). The print job is one example of an image forming process by MFP 100.

Referring to FIG. 10, CPU 101 determines in step S60 whether or not a time frame for maintenance of MFP 100 is set for MFP 100. More specifically, auxiliary storage device 104 of MFP 100 stores a file specifying details of operation settings of MFP 100. In step S60, CPU 101 refers to this file to determine whether or not a time frame for maintenance is set. When CPU 101 determines that a time frame for maintenance is set (YES in step S60), the control by CPU 101 proceeds to step S70. In contrast, when CPU 101 determines that a time frame for maintenance is not set (NO in step S60), the control proceeds to step S90.

In step S70, CPU 101 determines whether or not the time when step S90 is performed is included in the time frame for maintenance. When CPU 101 determines that it is included in the time frame for maintenance (YES in step S70), the control by CPU 101 proceeds to step S80. In contrast, when CPU 101 determines that it is not included in the time frame for maintenance (NO in step S70), the control returns to step S10.

In step S80, CPU 101 performs "session connection maintaining process 1" which is a subroutine for packet transmission. This subroutine will be described later herein with reference to FIGS. 11 and 12. After the control in step S80, the control by CPU 101 returns to step S10.

In step S90, CPU 101 determines whether or not the state of electric power of MFP 100 is a state in which packet transmission is impossible. For example, when the electric power state of MFP 100 is a normal electric power state, MFP 100 can transmit a packet. However, when the electric power state of MFP 100 is a power saving state and the power saving state is a state in which electric power is not supplied to communication device 106, MFP 100 cannot transmit a packet. When CPU 101 determines that the electric power state of MFP 100 is the state in which packet transmission is impossible (YES in step S90), the control by CPU 101 proceeds to step S100. In contrast, when CPU 100 determines that the electric power state of MFP 100 is the state in which packet transmission is possible (NO in step S90), the control proceeds to step S120.

In step S100, CPU 101 determines whether or not the reason why MFP 100 has switched to the power saving state is the control by a weekly timer of schedule information stored in auxiliary storage device 104 as described above. More specifically, CPU 101 compares the schedule information with the current time and makes the determination in step S100. When CPU 101 determines that the power saving state is due to the weekly timer (YES in step S100), the control by CPU 101 proceeds to step S110. In contrast, when CPU 101 determines that the power saving state is not due to the weekly timer (NO in step S100), the control returns to step S10 (FIG. 9).

In step S110, CPU 101 switches the electric power state of MFP 100 to a state in which a packet can be transmitted. For example, CPU 101 causes electric power to be supplied to communication device 106. The control then proceeds to step S120.

In step S120, CPU 101 performs "session connection maintaining process 1" which is a subroutine for packet transmission. This subroutine will be described later herein with reference to FIGS. 11 and 12. After this, the control proceeds to step S130.

In step S130, CPU 101 determines whether or not the control in step S120 is performed as a result of switching from the state in which packet transmission is impossible (whether or not it is performed after the control in step S110). When CPU 101 determines that the control in step S120 is performed as a result of switching from the state in which packet transmission is impossible (YES in step S130), the control proceeds to step S140. In contrast, when CPU 101 determines that the control in step S120 is performed without switching of the electric power state of MFP 100 (NO in step S130), the control returns to step S10 (FIG. 9).

Figure 11:
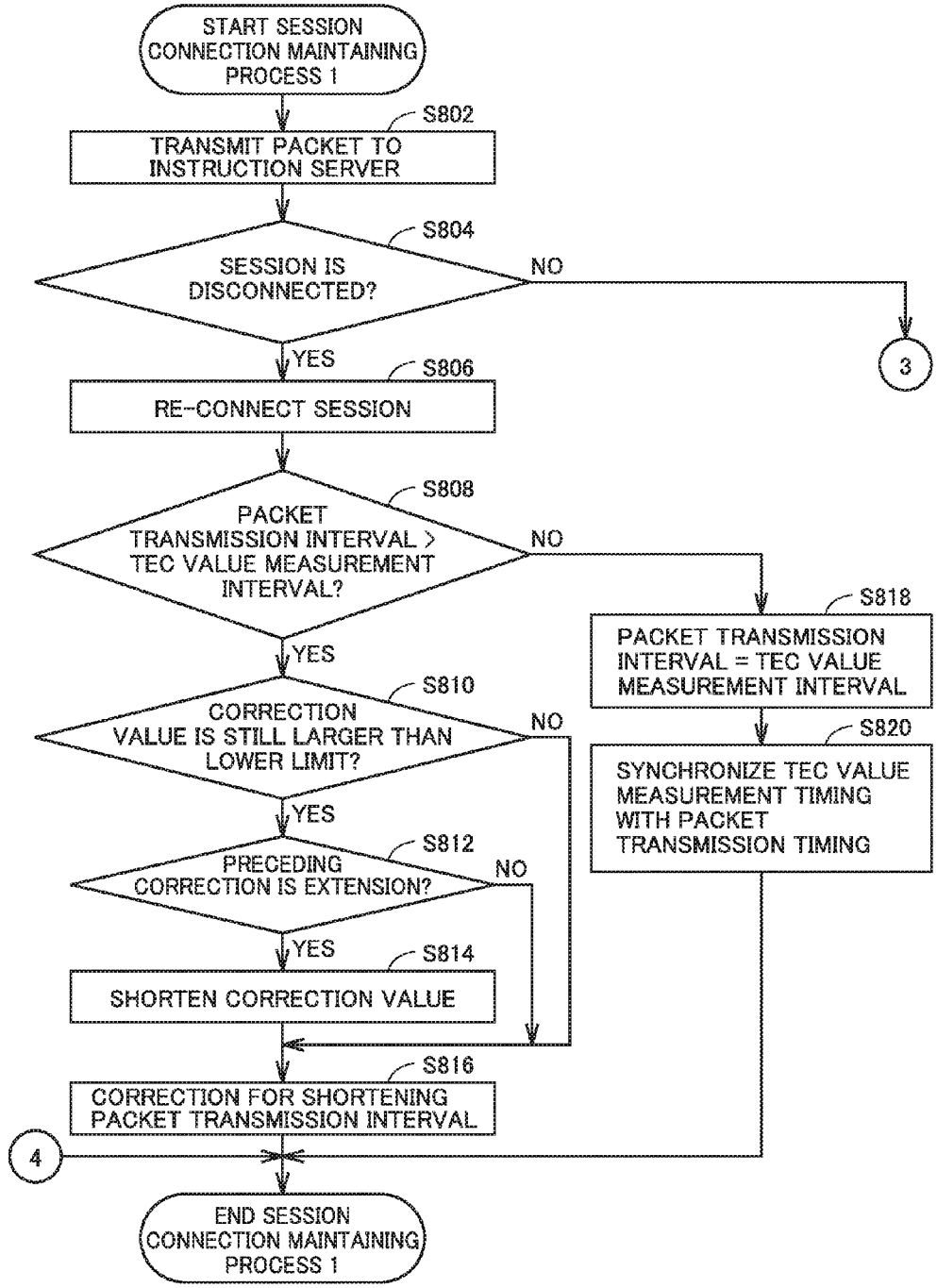
Figure 12:
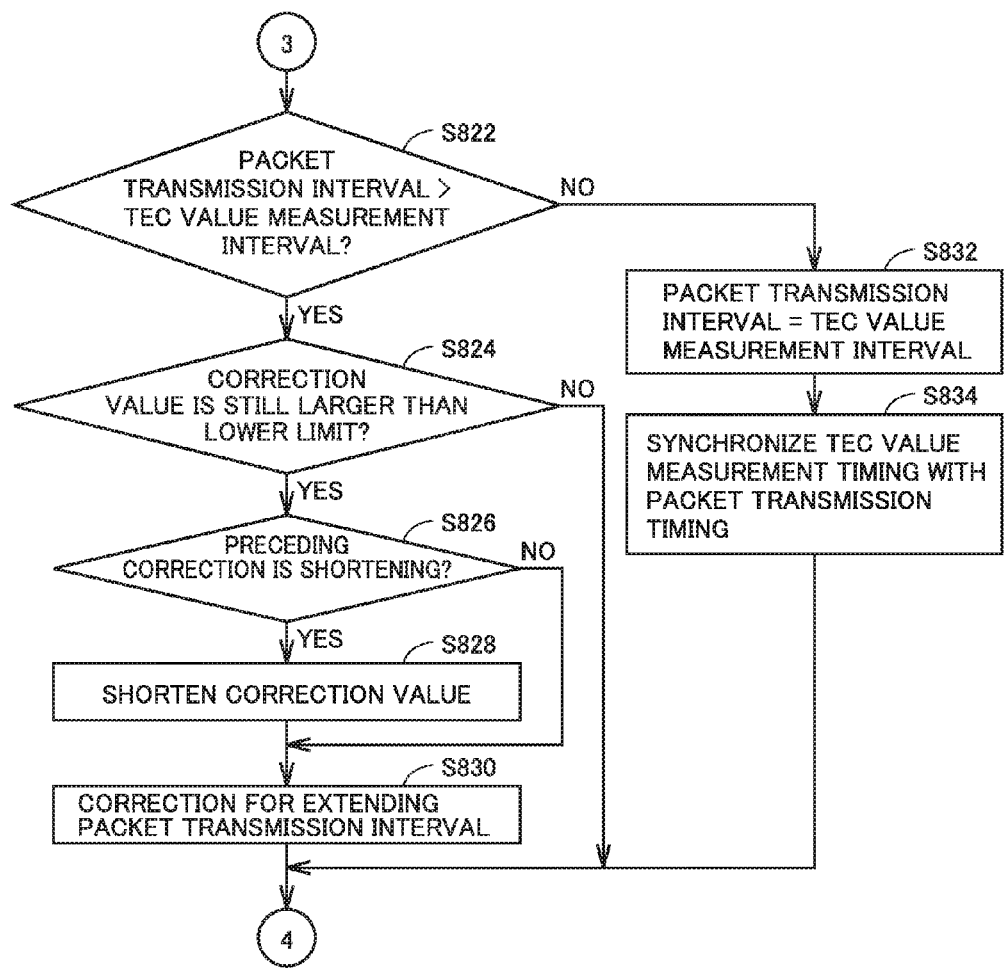

Referring next to FIGS. 11 and 12, "session connection maintaining process 1" which is a subroutine for packet transmission will be described.

Referring first to FIG. 11, in step S802 of "session connection maintaining process 1," CPU 101 uses communication device 106 to transmit to XMPP server 300 a packet which is transmitted for confirming connection and which is addressed to the instruction server. After this, the control proceeds to step S804.

In step S804, CPU 101 determines whether or not a session with instruction server 200 is disconnected. For example, CPU 101 determines that a session with instruction server 200 is maintained when receiving information indicating that the session with instruction server 200 is maintained, within a certain time from transmission of the packet in step S802. CPU 101 determines that the session is disconnected when CPU 101 does not receive such information within the certain time. Then, when CPU 101 determines that the session is disconnected (YES in step S804), the control proceeds to step S806. In contrast, when CPU 101 determines that the session is maintained (NO in step S804), the control proceeds to step S822 (FIG. 12).

In the present embodiment, CPU 101 determines whether or not it receives information which indicates that the session with instruction server 200 is maintained within a certain time after the packet for confirming connection is transmitted, and accordingly determines the state of connection after the connection is confirmed. Transmission of the packet for confirming connection is an example of confirmation of connection. Depending on whether or not the information is received within a certain time from transmission of the packet for confirming connection, the state of connection is specified.

In step S806, CPU 101 transmits to XMPP server 300 via router 500 information for establishing a session again with instruction server 200. After this, the control proceeds to step S808.

In step S808, CPU 101 determines whether or not the packet transmission interval is longer than a TEC value measurement interval for MFP 100. Information which specifies the TEC value measurement interval is stored for example in auxiliary storage device 104. When CPU 101 determines that the packet transmission interval is longer than the TEC value measurement interval (YES in step S808), the control proceeds to step S810. In contrast, when CPU 101 determines that the packet transmission interval is equal to or less than the TEC value measurement interval (NO in step S808), the control proceeds to step S818.

In step S810, CPU 101 determines whether or not a correction value at the time for the packet transmission interval is still larger than a lower limit. When CPU 101 determines that the correction value is still larger than the lower limit (YES in step S810), the control proceeds to step S812. When CPU 101 determines that the correction value is not still larger than the lower limit (NO in step S810), the control proceeds to step S816.

In step S812, CPU 101 determines whether or not the preceding correction of the packet transmission interval is "extension." In the process shown from FIG. 11 to FIG. 12, the packet transmission interval is corrected in step S816 and step S830 (FIG. 12) described later herein. More specifically, the packet transmission interval is shortened in step S816 and the packet transmission interval is extended in step S830. "Preceding correction of the packet transmission interval" means the correction in step S816 or step S830 of the preceding process. When CPU 101 determines that the preceding correction of the packet transmission interval is "extension" (YES in step S812), the control proceeds to step S814. In contrast, when CPU 101 determines that the preceding correction of the packet transmission interval is not "extension" (the correction is "shortening"), the control proceeds to step S816.

In step S814, CPU 101 shortens "correction value" for the packet transmission interval. After this, the control proceeds to step S816.

In step S816, CPU 101 shortens the packet transmission interval by "correction value" which is set at the time. CPU 101 ends "session connection maintaining process 1" and the control returns to FIG. 10. The initial value of "correction value" is stored in auxiliary storage device 104. "Correction value" is shortened in step S814 and step S828 (FIG. 12).

In step S818, CPU 101 sets the packet transmission interval equal to the length of the TEC value measurement interval. After this, the control proceeds to step S820.

In step S820, CPU 101 sets the timing at which the TEC value of MFP 100 is measured so that this timing is synchronized with the packet transmission timing. After this, CPU 101 ends "session connection maintaining process 1" and the control returns to FIG. 10.

Referring to FIG. 12, in step S822, CPU 101 determines whether or not the packet transmission interval is longer than the TEC value measurement interval of MFP 100. When CPU 101 determines that the packet transmission interval is longer than the TEC value measurement interval (YES in step S822), the control proceeds to step S824. In contrast, when CPU 101 determines that the packet transmission interval is equal to or less than the TEC value measurement interval (NO in step S822), the control proceeds to step S832.

In step S824, CPU 101 determines whether or not the correction value at the time for the packet transmission interval is still larger than the lower limit. When CPU 101 determines that the correction value is still larger than the lower limit (YES in step S824), the control proceeds to step S826. In contrast, when CPU 101 determines that the correction value is not still larger than the lower limit (NO in step S824), CPU 101 ends "session connection maintaining process 1" and the control returns to FIG. 10. Namely, in the case where the fact that the session between MFP 100 and instruction server 200 is maintained is confirmed and "correction value" for the packet transmission interval has reached the lower limit, the packet transmission interval is not corrected after packet transmission.

In step S826, CPU 101 determines whether or not the preceding correction of the packet transmission interval is "shortening." "Preceding correction of the packet transmission interval" means the correction in step S816 or step S830 in the preceding process. When CPU 101 determines that the preceding correction of the packet transmission interval is "shortening" (YES in step S826), the control proceeds to step S828. In contrast, when CPU 101 determines that the preceding correction of the packet transmission interval is not "shortening" (the correction is "extension"), the control proceeds to step S830.

In step S828, CPU 101 shortens "correction value" for the packet transmission interval. After this, the control proceeds to step S830.

In step S830, CPU 101 extends the packet transmission interval by "correction value" which is set at the time. After this, CPU 101 ends "session connection maintaining process 1" and the control returns to FIG. 10.

In step S832, CPU 101 sets the packet transmission interval equal to the length of the TEC value measurement interval. After this, the control proceeds to step S834.

In step S834, CPU 101 sets the timing at which the TEC value of MFP 100 is measured so that this timing is synchronized with the packet transmission timing. CPU 101 ends "session connection maintaining process 1" and the control returns to FIG. 10.

In the first embodiment as described above, MFP 100 regularly transmits an existence confirmation (Keep Alive) packet to XMPP server 300 via router 500 in order to maintain the session with instruction server 200. The time interval at which MFP 100 transmits the packet is referred to as "packet transmission interval" herein.

As described above with reference chiefly to FIGS. 6 and 7, MFP 100 can extend the packet transmission interval and can also shorten the packet transmission interval. Thus, when the packet transmission interval is longer than the session timeout period for the firewall function of router 500, the packet transmission interval is shortened. More specifically, after transmitting the packet, MFP 100 determines whether or not the session is maintained. When MFP 100 determines that the session is disconnected, MFP 100 shortens the packet transmission interval (step S816 in FIG. 11). In contrast, when MFP 100 determines that the session is maintained, MFP 100 extends the packet transmission interval (step S830 in FIG. 12).

The correction value by which the packet transmission interval is shortened or extended (the length of tune by which the interval is shortened or extended) is shortened in the case where the result indicating that the session is maintained/disconnected that is given after the packet transmission differs from the result that is given after the preceding packet transmission (step S814 in FIG. 11 and step S828 in FIG. 12). In the case where the correction value for the packet transmission interval has shortened to the lower limit even when it is determined after the packet transmission that the session is maintained, MFP 100 does not extend the packet transmission interval (NO in step S824 in FIG. 12).

According to the present disclosure, the image processing apparatus transmits to the session server a packet for confirming whether or not a session with the instruction server is connected. Accordingly, the session between the image processing apparatus and the instruction server can more reliably be maintained. The packet transmission interval is adjusted to fall within the session timeout period for the firewall function of the router. Accordingly, it does not occur that the packet transmission interval is controlled to be only shortened. As long as the packet transmission interval falls within the session timeout period, the packet transmission interval may also be controlled to be extended. In this way, increase of the load on the image processing apparatus is kept minimum.

Second Embodiment

1. Process Overview

An image processing system in a second embodiment has a similar configuration to that of the image processing system in the first embodiment. Characteristics of the image processing system in the second embodiment include a manner of changing "correction value" for correcting (extending or shortening) the packet transmission interval of MFP 100.

In the image processing system in the first embodiment, as the number of times the packet transmission interval is corrected (extended or shortened) increases and change of the packet transmission interval causes the packet transmission interval to fall in or out of the timeout period of router 500, the correction value for the interval correction at the time is shortened. In the first embodiment, each time the changed packet transmission interval becomes longer than or shorter than the timeout period, the correction value for the interval correction at the time is shortened. This is indicated for example in FIG. 6 by the fifth arrow and the subsequent arrows from the leftmost one, among which the arrow located rightward is shorter, and also indicated in FIG. 7 by the fifth arrow and the subsequent arrows from the leftmost one, among which the arrow located rightward is shorter.

Figure 13:
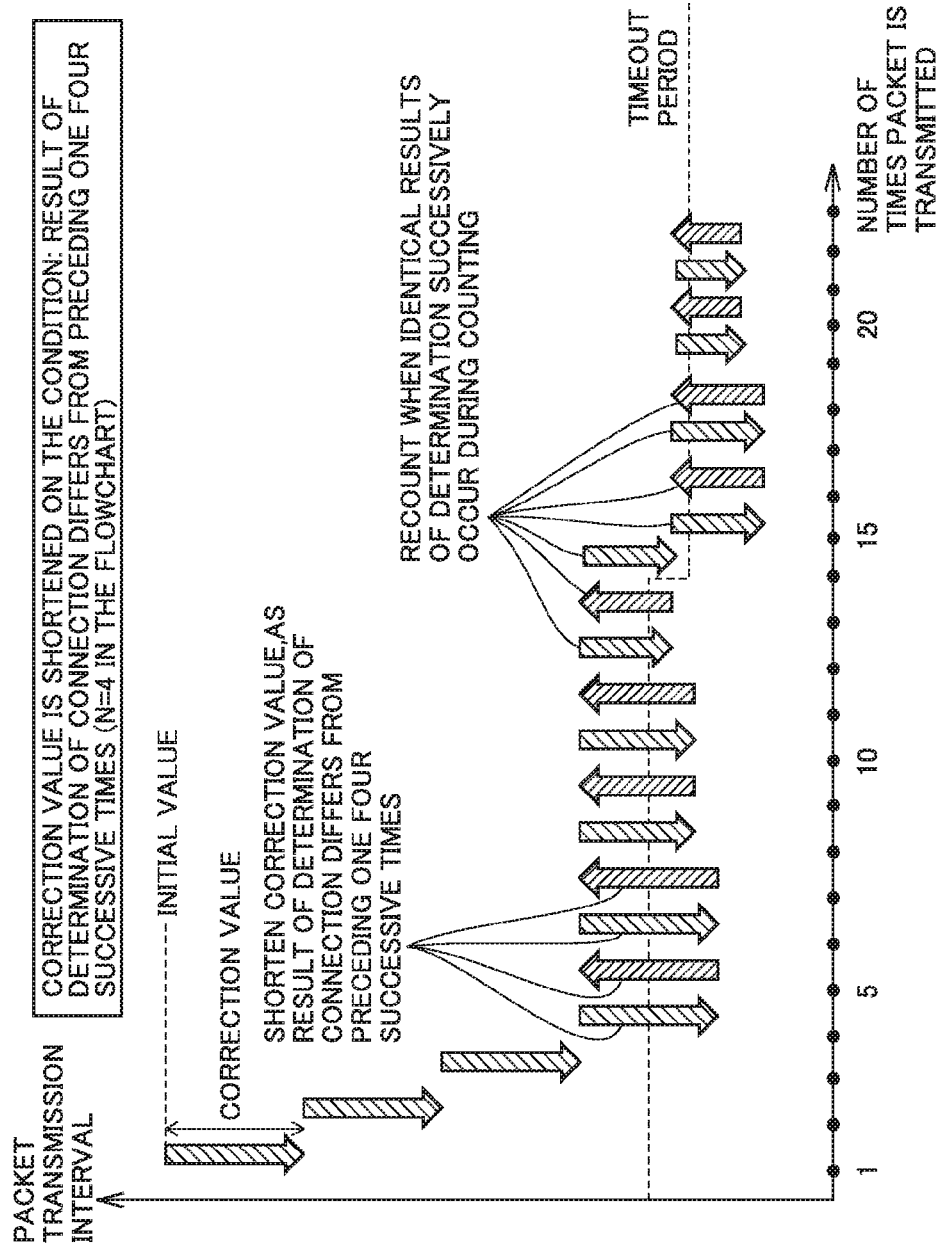
FIG. 13 is a diagram for illustrating a manner of changing a correction value for correcting a packet transmission interval in an image processing system in a second embodiment.
Figure 14:
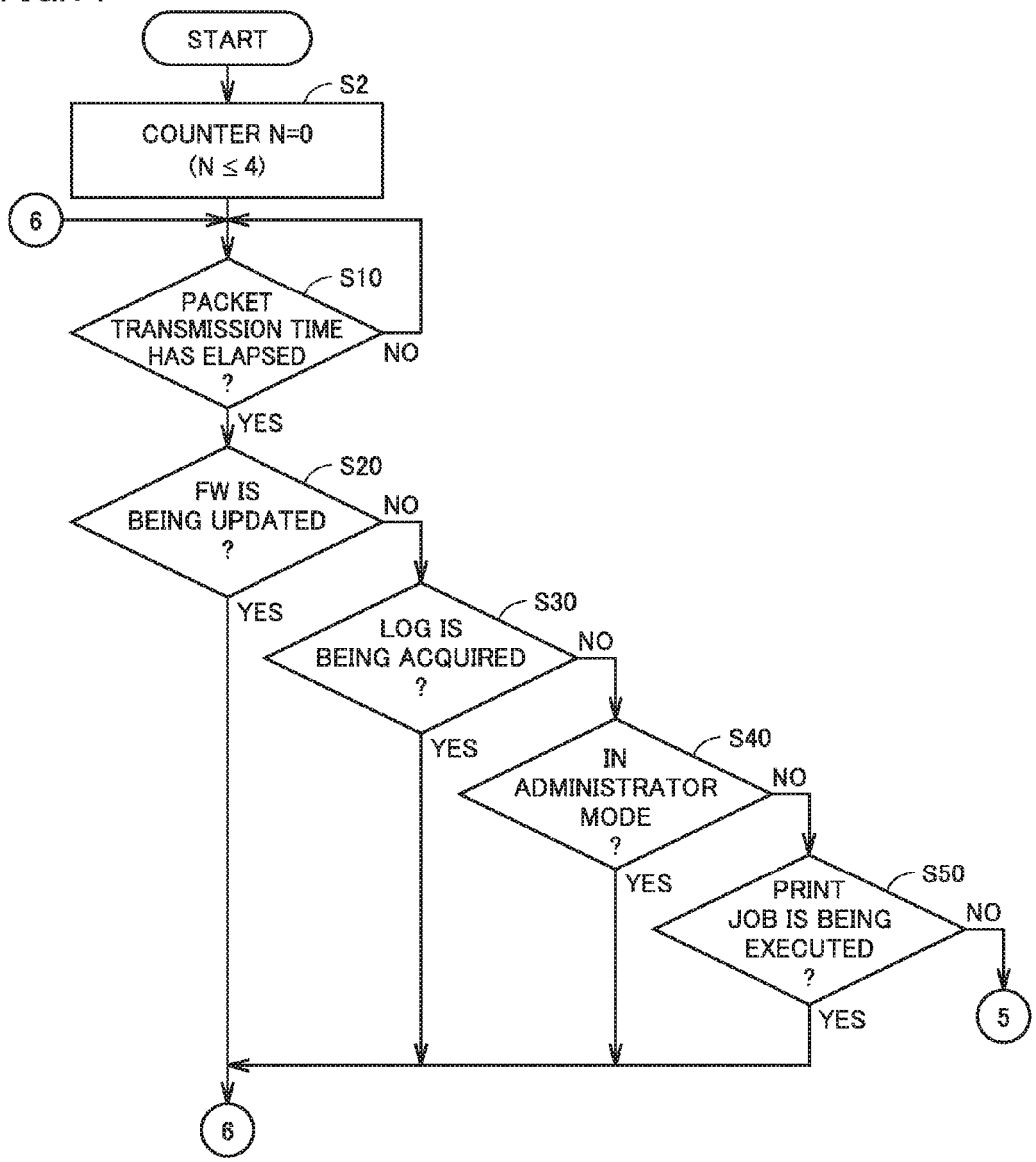
FIG. 14 is a flowchart of a process executed for packet transmission by an MFP in the second embodiment.

In the image processing system in the second embodiment, the correction value is shortened on the condition that the number of times change of the packet transmission interval causes the packet transmission interval to fall in or out of the timeout period reaches a predetermined number of times (four times for example). FIG. 13 is a diagram for illustrating a manner of changing the correction value for correcting the packet transmission interval in the image processing system in the second embodiment. The hatched arrow shown in FIG. 13 represents change (extension or shortening) of the packet transmission interval after packet transmission, similarly to FIG. 6 and the like.

In FIG. 13, the fourth arrow (downward) to the seventh arrow (upward) from the leftmost one are not identical in the direction of the arrow but identical in the length of the arrow. The eighth arrow (downward) from the leftmost one is shorter in length than the fourth to seventh arrows. This means that the correction value is not changed until the packet transmission interval is corrected to be shortened and extended alternately four successive times although the change of the packet transmission interval causes the packet transmission interval to fall in or out of the timeout period. After the packet transmission interval is alternately shortened and extended four successive times, the correction value is shortened.

In the case where change of the packet transmission interval does not cause the packet transmission interval to fall in or out of the timeout period, before the number of successive times the packet transmission interval is changed to in or out of the timeout period reaches a predetermined number of times, the count of the times with respect to the predetermined number of times is initialized.

More specifically, the three arrows which are the 12th to 14th arrows from the leftmost one indicate that the packet transmission interval is corrected to be alternately shortened and extended three successive times. However, the timeout period of router 500 is shortened. Therefore, like the 14th correction, the 15th correction shortens the packet transmission interval. This is indicated by the fact that the 15th arrow from the leftmost one in FIG. 13 is directed downward like the 14th arrow in FIG. 13. At this time, the count of the number of times for the 12th to 14th arrows, namely "three successive times," is initialized.

Namely in the example in FIG. 13, the 15th to 18th corrections cause the packet transmission interval to be changed to fall in or out of the timeout period four successive times. Based on this, the 19th correction shortens the correction value. This is indicated in FIG. 13 by the fact that immediately adjacent arrows of the 15th to 18th arrows are different in direction but identical in length, and that the 19th arrow is shorter in length than the 15th to 18th arrows.

2. Process Flow

FIGS. 14 to 17 show a flowchart of a process executed for packet transmission by MFP 100 in the second embodiment. The process shown in FIG. 14 to FIG. 15 corresponds to the process shown in FIG. 9 to FIG. 10 in the first embodiment. In the process shown in FIG. 14, CPU 101 first sets the value of a counter N to zero in step S2. Counter N counts the number of successive times the packet transmission interval is changed to fall in or out of the timeout period as described above with reference to FIG. 13. The upper limit of the count value of counter N is four. After executing the control in step S2, CPU 101 executes the control in step S10 and subsequent steps, similarly to the first embodiment.

Figure 15:
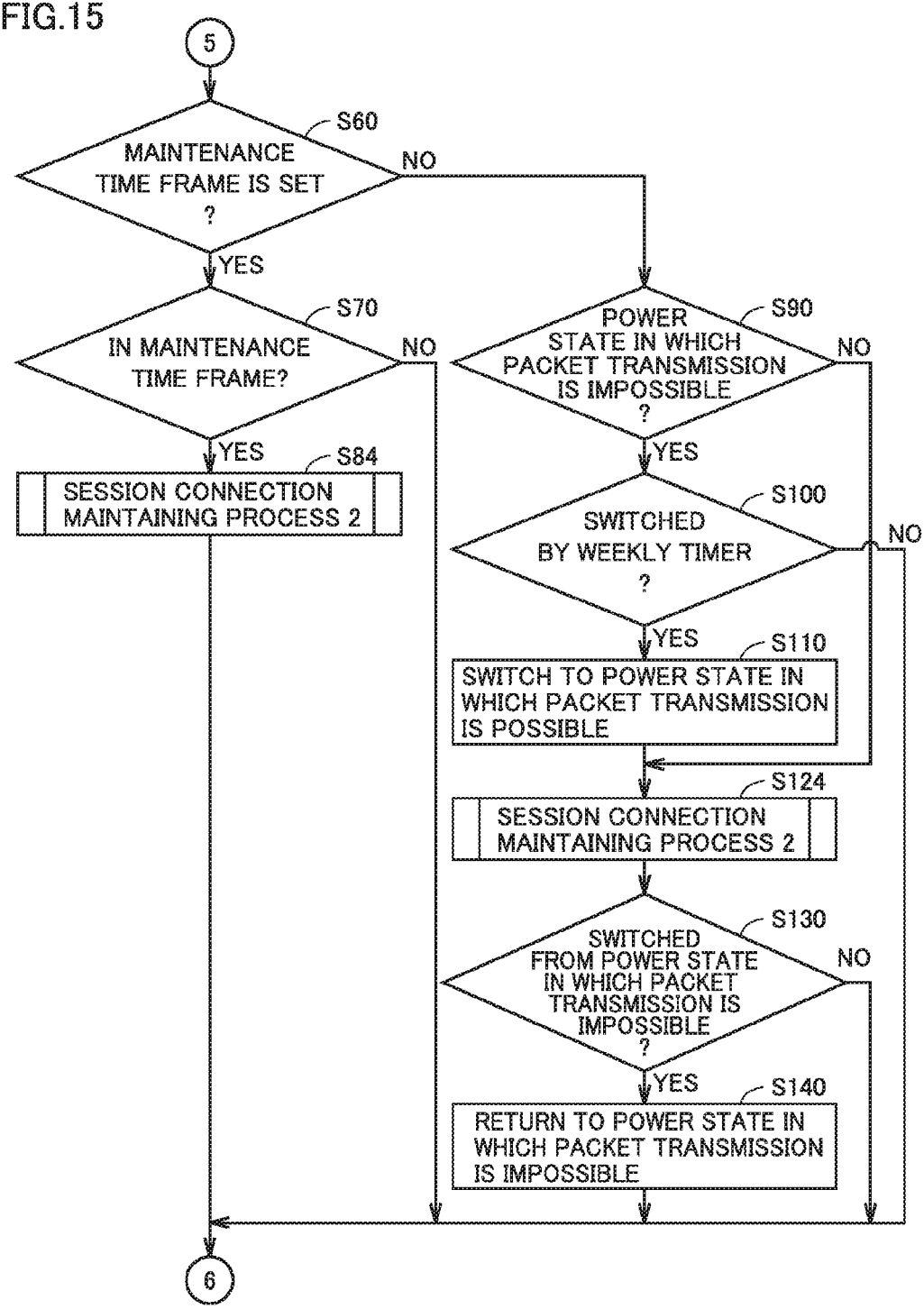
FIG. 15 is a flowchart of a process executed for packet transmission by the MFP in the second embodiment.
Figure 16:
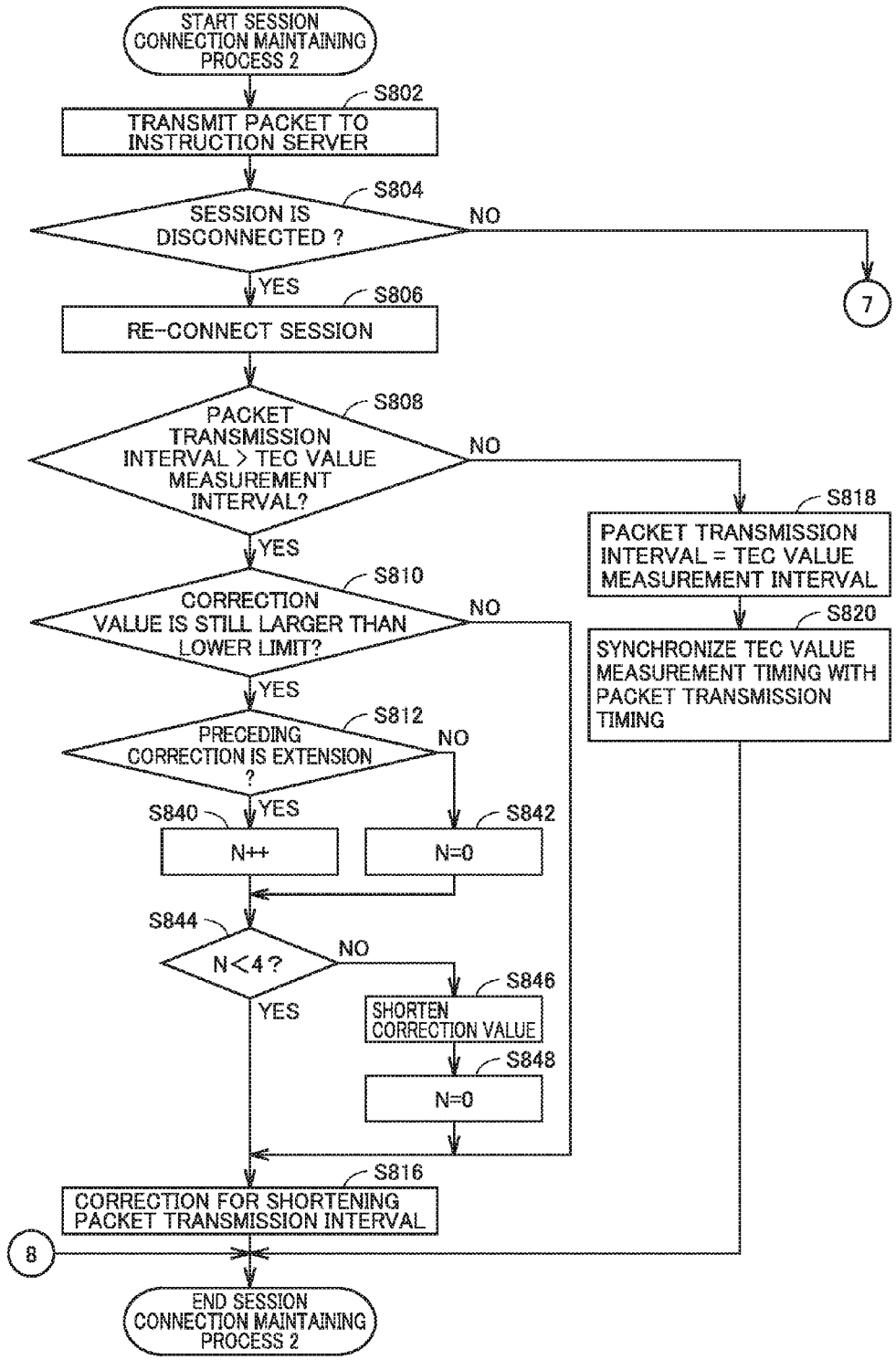
FIGS. 16 and 17 show a flowchart of a subroutine for "session connection maintaining process 2."
Figure 17:
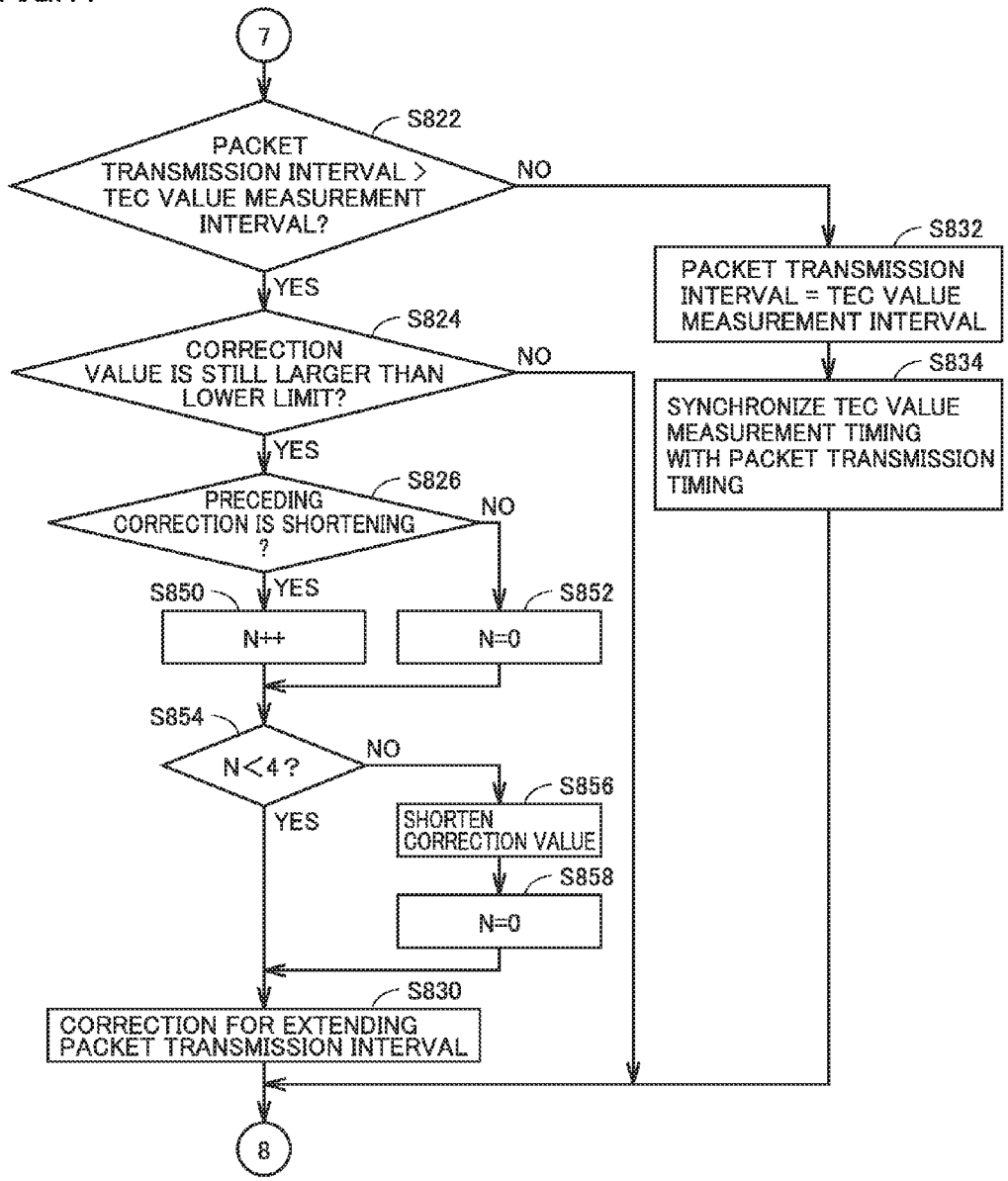

As shown in step S84 and step S124 in FIG. 15, CPU 101 in the second embodiment executes "session connection maintaining process 2" instead of "session connection maintaining process 1" (step S80 and step S120 in FIG. 10) in the first embodiment. "Session connection maintaining process 2" will be described later herein with reference to FIGS. 16 and 17. FIGS. 16 and 17 show a flowchart of a subroutine of "session connection maintaining process 2."

As described above with reference to FIG. 11, when CPU 101 in the first embodiment determines in step S812 that the preceding correction is "extension," CPU 101 shortens the correction value in step S814 and thereafter the control proceeds to step S816.

In contrast, in the second embodiment as shown in FIG. 16, CPU 101 executes the control in step S840 to step S848 instead of step S814.

Namely, when CPU 101 determines in step S812 that the preceding correction is "extension" (YES in step S812), CPU 101 updates the count value of counter N by adding "1" in step S840. After this, the control proceeds to step S844. In contrast, when CPU 101 determines in step S812 that the preceding correction is not "extension" (NO in step S812), CPU 101 returns the count value of counter N to zero in step S842. After this, the control proceeds to step S844.

In step S844, CPU 101 determines whether the count value of counter N is still less than "4" or not. When CPU 101 determines that the count value is still less than "4" (YES in step S844), the control proceeds to step S816. In contrast, when CPU 101 determines that the count value has reached "4" (NO in step S844), the control proceeds to step S846.

In step S846, CPU 101 shortens the correction value for the packet transmission interval. After this, the control proceeds to step S848.

In step S848, CPU 101 returns the count value of counter N to zero. After this, the control proceeds to step S816.

As described above with reference to FIG. 12, when CPU 101 in the first embodiment determines in step S826 that the preceding correction is "shortening," CPU 101 shortens the correction value in step S828 and the control proceeds to step S830. In contrast, in the second embodiment as shown in FIG. 17, CPU 101 executes the control in step S850 to step S858 instead of step S828.

Namely, when CPU 101 determines in step S826 that the preceding correction is "shortening" (YES in step S826), CPU 101 updates the count value of counter N by adding "1" in step S850. After this, the control proceeds to step S854. In contrast, when CPU 101 determines in step S826 that the preceding correction is not "shortening" (NO in step S826), CPU 101 returns the count value of counter N to zero in step S852. After this, the control proceeds to step S854.

In step S854, CPU 101 determines whether the count value of counter N is still less than "4" or not. When CPU 101 determines that the count value is still less than "4" (YES in step S854), the control proceeds to step S830. In contrast, when CPU 101 determines that the count value has reached "4" (NO in step S854), the control proceeds to step S856.

In step S856, CPU 101 shortens the correction value for the packet transmission interval. After this, the control proceeds to step S858.

In step S858, CPU 101 returns the count value of counter N to zero. After this, the control proceeds to step S830.

Third Embodiment

Figure 18:
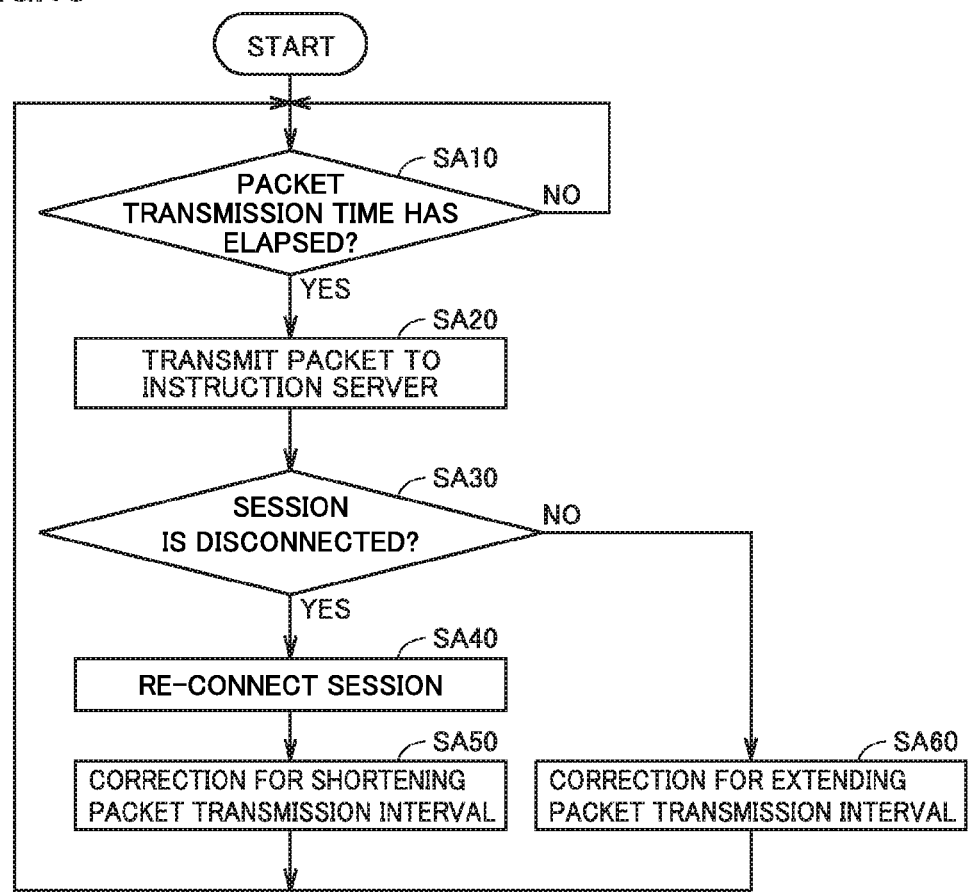
FIG. 18 is a flowchart of a process executed by CPU (Central Processing Unit) of an instruction server in a third embodiment.

In an image processing system in a third embodiment, instruction server 200 transmits a packet for maintaining a session between MFP 100 and instruction server 200. FIG. 18 is a flowchart of a process executed by CPU 201 (see FIG. 4) of instruction server 200 in the third embodiment.

Referring to FIG. 18, CPU 201 determines in step SA10 whether or not the time which is defined as "packet transmission time" has elapsed since the preceding packet transmission. The control by CPU 201 remains in step SA10 (NO in step SA10) until CPU 201 determines that the packet transmission time has elapsed. When CPU 201 determines that the packet transmission time has elapsed (YES in step SA10), the control proceeds to step SA20.

In step SA20, CPU 201 uses communication device 206 (see FIG. 4) to transmit the packet as described above to XMPP serer 300. After this, the control proceeds to step SA30.

In step SA30 CPU 201 determines whether or not a session between MFP 100 and instruction server 200 is disconnected. Like CPU 101 in step S804 (FIG. 11), CPU 201 makes the determination in step SA30 based on whether or not it receives from MFP 100 a response to the packet transmission in step SA20, for example. When CPU 201 determines that the session is disconnected (YES in step SA30), the control proceeds to step SA40. In contrast, when CPU 201 determines that the session is maintained (NO in step SA30), the control proceeds to step S60.

In step SA40, CPU 201 transmits to XMPP server 300 information for re-connecting the session between MFP 100 and instruction server 200. After this, the control proceeds to step SA50.

In step SA50, CPU 201 shortens the packet transmission interval and the control returns to step SA10.

In contrast, in step SA60, CPU 201 extends the packet transmission interval and the control returns to step SA10.

In the above-described third embodiment, the packet transmission time is corrected after the packet is transmitted. More specifically, in the case where the session is disconnected, the packet transmission time is shortened (step SA50). In contrast, when the session is maintained, the packet transmission time is extended (step SA60).

The correction value for the packet transmission time when the packet transmission time is corrected (shortened/extended) my be made shorter, as described above with reference to FIG. 6 for example, in the case where the packet transmission time is considered as being changed to fall in or out of the timeout period for the firewall function of router 500.

Fourth Embodiment

In a fourth embodiment, MFP 100 uses a variety of servers such as firmware distribution server (1) 910 as shown in FIG. 1 to implement a function which is specified by instruction information from instruction server 200. In the case where there is no server which is accessible for implementing the function, MFP 100 does not transmit a packet for maintaining a session between MFP 100 and instruction server 200.

Figure 19:
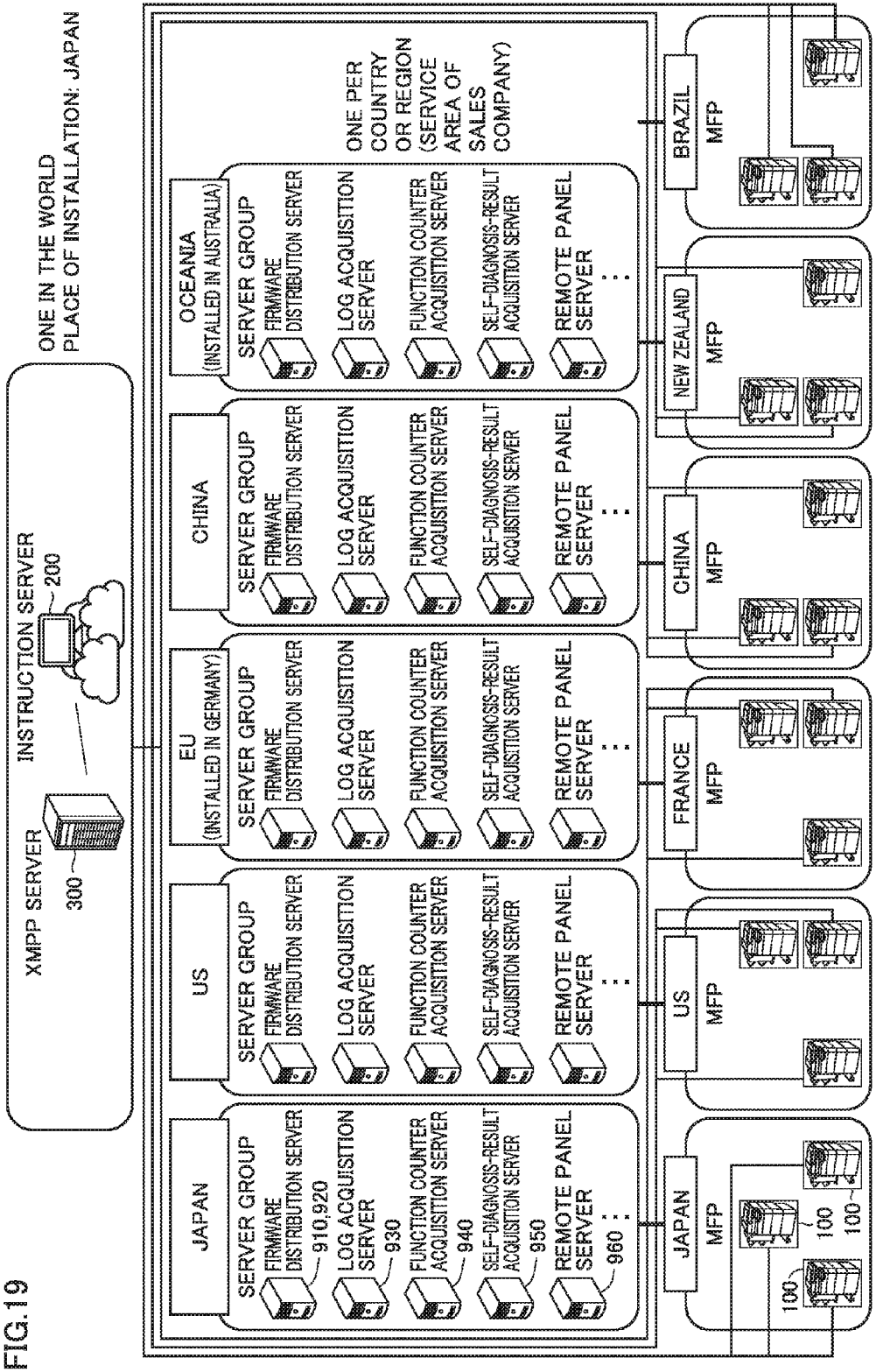
FIG. 19 is a diagram showing a configuration of an image processing system in a fourth embodiment.

FIG. 19 is a diagram showing a configuration of an image processing system in the fourth embodiment. In the example shown in FIG. 19, the image processing system is deployed worldwide. More specifically, there is only one instruction server 200 and only one XMPP server 300 in the world. In contrast, respective server groups are installed in multiple regions (Japan, US, Europe (EU), China, and Oceania). MFP 100 is provided in each country (Japan, US, France, China, New Zealand, for example) which belongs to any of the multiple regions. MFP 100 provided in each country accesses the server group provided in the region to which the country belongs.

In the image processing system in the fourth embodiment, MFPs 100 which are installed worldwide each set up a session with instruction server 200. The server group installed in each region is managed by instruction server 200. MFP 100 implements a function which is specified by instruction information received from instruction server 200. In order to implement this function, MFP 100 accesses a server which is a constituent server of the server group, as required. It should be noted that CPU 101 of MFP 100 issues an inquiry to instruction server 200 about whether or not a server can be used for implementing the function. In this case, CPU 101 analyzes for example the instruction information from instruction server 200 to thereby specify a function to be implemented by MFP 100, and specifies the type of server for implementing the function. CPU 101 issues an inquiry to instruction server 200 about whether or not it can access the specified server. When an answer made by instruction server 200 to the inquiry is that the access is impossible, CPU 101 stops transmission of a packet for maintaining the session between MFP 100 and instruction server 200. In response to operation or the like of operation panel 107, for example, CPU 101 may restart transmission of a packet for maintaining the session.

Specific examples of the functions of MET 100 specified by the instruction information from instruction server 200 in the image processing system will be described in the following.

An example of the functions implemented through use of the server group is downloading of firmware. More specifically, MFP 100 requests firmware distribution server (1) 910 and/or a firmware distribution server (2) 920 to provide downloading of firmware. In response to the request, firmware distribution server (1) 910 and/or firmware distribution server (2) 920 transmits to MFP 100 firmware to be executed by MFP 100.

Another example of the functions implemented through use of the server group is transfer of a debug log. More specifically, MFP 100 transfers a debug log to log acquisition server 930. Log acquisition server 930 accumulates the debug log. Following an instruction or the like from a user, MFP 100 may read the debug log from log acquisition server 930.

Still another example of the functions implemented through use of the server group is transfer of a count value (the number of times any of a variety of functions used by each MFP 100 is implemented (for example, the number of sheets of paper to which an image has been output by MFP 100)) of a function counter. MFP 100 includes a variety of function counters. MFP 100 transmits the count value of each function counter to function counter acquisition server 940.

A further example of the functions implemented through use of the server group is transfer of a self-diagnosis result. MFP 100 transmits to self-diagnosis-result acquisition server 950 the result of diagnosis of the state (such as the amount of consumed toner) in MFP 100.

A further example of the functions implemented through use of the server group is use of a remote panel. MFP 100 causes a terminal which can communicate via remote panel server 960 to function as a remote panel. Namely MFP 100 receives operational instructions from the terminal and operates in accordance with the operational instructions.

[Summary of Control for Packet Transmission in the Present Disclosure]

As described above in connection with each embodiment, the image processing system of the present disclosure automatically optimizes the packet transmission interval depending on the environment of MFP 100. In the following, characteristic control details in the present disclosure will be described one by one.

In the case where the result of confirmation as to whether or not a session is connected is that the session is disconnected, the session is re-connected and the packet transmission interval is corrected to be shortened.

In the case where the result of confirmation as to whether or not a session is connected is that the session is connected, the packet transmission interval is corrected to be extended.

In the case where the result of confirmation as to whether or not a session is connected differs from the result of the preceding confirmation, the correction value for the packet transmission interval is decreased. On the condition that the number of times the result of confirmation as to whether or not a session is connected differs from the result of the preceding confirmation reaches a predetermined number of times, the correction value for the packet transmission interval may be decreased.

In the case where the correction value for the packet transmission interval reaches a lower limit, increase/decrease of the correction value is stopped.

In the case where it is confirmed that a session is connected and the correction value for the packet transmission interval reaches a lower limit, correction of the packet transmission interval is stopped. In the case where disconnection of a session is detected after the correction of the packet transmission interval is stopped, the correction is restarted.

MFP 100 is switchable among a plurality of electric power states which are different in power consumption. The electric power states to be assumed by MFP 100 include an electric power state in which the power consumption is low to the extent that a module performing packet transmission does not operate. In the case where MFP 100 is in this electric power state of low power consumption, MFP 100 is switched to an electric power state at a level that allows the aforementioned module to operate, before the confirmation as to whether or not a session is connected. After this, whether or not a session is connected is confirmed. It should be noted that in the case where MFP 100 has been switched, due to a weekly timer, to an electric power state at a level that does not allow the module performing packet transmission to operate, MFP 100 is not switched to the electric power state at the level that allows the module to operate. This is for the reason that MFP 100 at this time has been switched to the state of low power consumption in accordance with a user's intention.

When MFP 100 measures the TEC value of MFP 100, it is necessary for MFP 100 to be in the same electric power state for a certain time. Therefore, when the packet transmission interval is smaller than the TEC value measurement interval, the packet transmission interval is set equal to the TEC value measurement interval, and packet transmission and TEC value measurement are done in synchronization with each other.

For MFP 100, a time frame (maintenance time frame) may be defined in which MFP 100 does not switch to the electric power state at the level that does not allow the module performing packet transmission to operate. In the case where this time frame is defined, MFP 100 may transmit a packet in this time frame to keep the session and thereby receive a remote instruction. Therefore, in the time period excluding the aforementioned time frame, it is unnecessary to maintain the session. Thus, in the time period excluding the aforementioned time frame, MFP 100 does not switch to the electric power state at the level that allows the module performing packet transmission to operate.

A lower limit of the packet transmission interval may be set. The fact that the lower limit is set means that a user does not permit packet transmission at intervals shorter than the lower limit. Therefore, when the packet transmission interval reaches a lower limit, MFP 100 stops correction of the packet transmission interval.

In the case where MFP 100 is in a state in which MFP 100 receives instruction information from instruction server 200 but MFP 100 cannot carry out the instruction, the function (such as packet transmission) for maintaining connection of a session is stopped until the aforementioned state is overcome. This is for the reason that it is necessary to maintain the session in such a case. An example of this state is a state in which FW (firmware) is being updated. This is for the reason that during FW update MFP 100 cannot perform other processes. Another example is a state in which a log is being acquired. This is for the reason that during log acquisition MFP 100 is acquiring the log for the current state and extra operations should not be performed by MFP 100. Still another example is a state in which MFP 100 is being in an administrator mode. This is for the reason that during operation by an administrator MFP 100 does not accept instructions for other operations. A further example is a state in which a print job is being performed. This is for the reason that deterioration of the printing performance due to packet transmission should be avoided.

Although the present invention has been described and illustrated in detail, it is clearly understood that the same is by way of illustration and example only and is not to be taken by way of limitation, the scope of the present invention being interpreted by the terms of the appended claims.

What is claimed is:

1. An image processing system comprising:
   an image processing apparatus;
   an instruction server configured to transmit instruction information to the image processing apparatus via a router having a firewall function; and
   a session server configured to set up a session between the image processing apparatus and the instruction server,
   the image processing apparatus including:
      a processor; and
      a communication device,
   the processor being configured to control a state of the image processing apparatus to be one of a plurality of states including a normal state and a power saving state in which a power consumption is smaller than a power consumption in the normal state, the communication device being configured to transmit to
the session server a connection confirmation packet for
a session between the instruction server and the image
processing apparatus, and the processor being configured to
adjust a transmission interval of the connection confirmation packet based on a connection state of the session between the instruction server and the image processing apparatus after previous transmission of the connection confirmation packet, so that the transmission interval is within a session timeout period for the firewall function of the router by:
shortening the transmission interval in a case where the session between the image processing apparatus and the instruction server is disconnected and extending the transmission interval in a case where the session between the image processing apparatus and the instruction server is connected, and
decreasing a value of a time by which the transmission interval is shortened or extended, in a case where a result which represents connection or disconnection of the session between the image processing apparatus and the instruction server is different from a result derived from preceding packet transmission, and
switch the state of the image processing apparatus to a state in which the communication device can at least transmit a packet, in a case where the state of the image processing apparatus is the power saving state when a time specified by the transmission interval elapses from previous transmission of the connection confirmation packet.

2. The image processing system according to claim 1, wherein the processor is configured not to change a length of time by which the transmission interval is shortened or extended, in a case where the value of the time by which the transmission interval is shortened or extended reaches a predetermined value.

3. The image processing system according to claim 1, wherein the processor is configured not to shorten or extend the transmission interval in a case where the value of the time by which the transmission interval is shortened or extended reaches a predetermined value.

4. The image processing system according to claim 3, wherein the processor is configured to restart shortening or extension of the transmission interval on a condition that the value of the time by which the transmission interval is shortened or extended reaches a predetermined value and thereafter disconnection of the session between the image processing apparatus and the instruction server is detected.

5. The image processing system according to claim 1, wherein the processor is configured to return the state of the image processing apparatus to the power saving state, in a case where the processor switches the state of the image processing apparatus to the state in which the communication device can at least transmit a packet and thereafter establishment of the session between the image processing apparatus and the instruction server is confirmed through packet transmission by the communication device.

6. The image processing system according to claim 1, wherein the processor is configured not to switch the state of the image processing apparatus to a state in which the communication device can transmit a packet, in a case where the processor controls the state of the image processing apparatus to be the power saving state in accordance with a predetermined schedule, even when the time specified by the transmission interval elapses from transmission of the packet by the communication device.

7. The image processing system according to claim 1, wherein the communication device is configured to transmit the packet to the session server only in a specific period rather than at the transmission interval, in a case where the specific period is set in which the image processing apparatus is not set in the power saving mode.

8. The image processing system according to claim 1, wherein the processor is configured not to switch the state of the image processing apparatus to the state in which the communication device can at least transmit a packet, in a case where the transmission interval reaches a predetermined lower limit, even when the state of the image processing apparatus is the power saving state, after elapse of a time specified by the transmission interval from transmission of the packet by the communication device.

9. The image processing system according to claim 1, wherein the processor is configured to stop transmission of the packet in a case where the image processing apparatus is in a state in which the image processing apparatus cannot carry out an instruction specified by the instruction information.

10. The image processing system according to claim 9, wherein the state in which the image processing apparatus cannot carry out an instruction specified by the instruction information includes at least any one of:
a state in which a firmware update process is executed in the image processing apparatus;
a state in which a log acquisition process is executed in the image processing apparatus;
a state in which control is executed in an administrator mode in the image processing apparatus; and
a state in which the image processing apparatus executes image formation.

11. An image processing system comprising:
an image processing apparatus;
an instruction server configured to transmit instruction information to the image processing apparatus via a router having a firewall function; and
a session server configured to set up a session between the image processing apparatus and the instruction server,
the image processing apparatus including:
a processor; and
a communication device,
the processor being configured to control a state of the image processing apparatus to be one of a plurality of states including a normal state and a power saving state in which a power consumption is smaller than a power consumption in the normal state,
the communication device being configured to transmit to the session server a connection confirmation packet for a session between the instruction server and the image processing apparatus, and
the processor being configured to
adjust a transmission interval of the connection confirmation packet based on a connection state of the session between the instruction server and the image processing apparatus after previous transmission of the connection confirmation packet, so that the transmission interval is within a session timeout period for the firewall function of the router by:
shortening the transmission interval in a case where the session between the image processing apparatus and the instruction server is disconnected and extending the transmission interval in a case where the session between the image processing apparatus and the instruction server is connected, and in a case where the number of times a result which represents connection or disconnection of the session between the image processing apparatus and the instruction server is different from a result derived from preceding packet transmission reaches a predetermined number of times, decreasing a value of a time by which the transmission interval is shortened or extended subsequently, and switch the state of the image processing apparatus to a state in which the communication device can at least transmit a packet, in a case where the state of the image processing apparatus is the power saving state when a time specified by the transmission interval elapses from previous transmission of the connection confirmation packet.

12. An image processing system comprising:
an image processing apparatus;
an instruction server configured to transmit instruction information to the image processing apparatus via a router having a firewall function; and
a session server configured to set up a session between the image processing apparatus and the instruction server,
the image processing apparatus including:
a processor; and
a communication device,
the processor being configured to control a state of the image processing apparatus to be one of a plurality of states including a normal state and a power saving state in which a power consumption is smaller than a power consumption in the normal state,
the communication device being configured to transmit to the session server a connection confirmation packet for a session between the instruction server and the image processing apparatus, and
the processor being configured to
adjust a transmission interval of the connection confirmation packet based on a connection state of the session between the instruction server and the image processing apparatus after previous transmission of the connection confirmation packet, so that the transmission interval is within a session timeout period for the firewall function of the router, and
switch the state of the image processing apparatus to a state in which the communication device can at least transmit a packet, in a case where the state of the image processing apparatus is the power saving state when a time specified by the transmission interval elapses from previous transmission of the connection confirmation packet,
wherein
the processor is further configured to execute a process of acquiring a TEC (Typical Electricity Consumption) value of the image processing apparatus, and
the processor is further configured not to shorten the transmission interval any more, in a case where the transmission interval is less than an interval at which the TEC value is measured.

13. The image processing system according to claim 12, wherein the processor is configured to synchronize a timing at which the TEC value is measured, with a timing at which a packet is transmitted by the communication device.

14. An image processing system comprising:
an image processing apparatus;
an instruction server configured to transmit instruction information to the image processing apparatus via a router having a firewall function;
a session server configured to set up a session between the image processing apparatus and the instruction server,
the image processing apparatus including:
a processor; and
a communication device,
the processor being configured to control a state of the image processing apparatus to be one of a plurality of states including a normal state and a power saving state in which a power consumption is smaller than a power consumption in the normal state,
the communication device being configured to transmit to the session server a connection confirmation packet for a session between the instruction server and the image processing apparatus, and
the processor being configured to
adjust a transmission interval of the connection confirmation packet based on a connection state of the session between the instruction server and the image processing apparatus after previous transmission of the connection confirmation packet, so that the transmission interval is within a session timeout period for the firewall function of the router, and
switch the state of the image processing apparatus to a state in which the communication device can at least transmit a packet, in a case where the state of the image processing apparatus is the power saving state when a time specified by the transmission interval elapses from previous transmission of the connection confirmation packet; and
a server group connectable with the image processing apparatus, wherein
the image processing apparatus is further configured to transmit and receive data to and from the server group,
the instruction server is further configured to manage the server group,
the processor is configured to issue an inquiry to the instruction server about whether or not a server available for carrying out an instruction specified by the instruction information is included in the server group, and
the communication device is further configured to stop transmission of the packet, in a case where the processor acquires an answer from the instruction server, the answer indicating that a server available for carrying out an instruction specified by the instruction information is not included in the server group.

15. An image processing apparatus comprising:
a communication device configured to receive instruction information from an instruction server via a router having a firewall function; and
a processor configured to control a state of the image processing apparatus to be one of a plurality of states including a normal state and a power saving state in which a power consumption is smaller than a power consumption in the normal state,
the communication device being configured to transmit to a session server, which is configured to set up a session between the image processing apparatus and the instruction server, a connection confirmation packet for the session between the image processing apparatus and the instruction server, and
the processor being configured to
adjust a transmission interval of a packet transmitted by the communication device, based on a connection state of the session between the instruction server and the image processing apparatus after connection confirmation, so that the transmission interval is within a session timeout period for the firewall function of the router by:
- shortening the transmission interval in a case where the session between the image processing apparatus and the instruction server is disconnected and extending the transmission interval in a case where the session between the image processing apparatus and the instruction server is connected, and
- decreasing a value of a time by which the transmission interval is shortened or extended, in a case where a result which represents connection or disconnection of the session between the image processing apparatus and the instruction server is different from a result derived from preceding packet transmission, and switch the state of the image processing apparatus to a state in which the communication device can at least transmit a packet, in a case where the state of the image processing apparatus is the power saving state when a time specified by the transmission interval elapses from transmission of the packet.

16. The image processing apparatus according to claim 15, wherein the processor is configured to return the state of the image processing apparatus to the power saving state, in a case where the processor switches the state of the image processing apparatus to the state in which the communication device can at least transmit a packet and thereafter establishment of the session between the image processing apparatus and the instruction server is confirmed through packet transmission by the communication device.

17. A non-transitory computer-readable storage medium storing a program executed by a processor of an image processing apparatus configured to receive instruction information from an instruction server via a router having a firewall function,
the program causing the processor to execute the steps of:
- controlling a state of the image processing apparatus to be one of a plurality of states including a normal state and a power saving state in which a power consumption is smaller than a power consumption in the normal state;
- transmitting, to a session server configured to set up a session between the image processing apparatus and the instruction server, a connection confirmation packet for the session between the image processing apparatus and the instruction server;
- adjusting a transmission interval of the connection confirmation packet, based on a connection state of the session between the instruction server and the image processing apparatus after connection confirmation, so that the transmission interval is within a session timeout period for the firewall function of the router by:
  - shortening the transmission interval in a case where the session between the image processing apparatus and the instruction server is disconnected and extending the transmission interval in a case where the session between the image processing apparatus and the instruction server is connected, and
  - decreasing a value of a time by which the transmission interval is shortened or extended, in a case where a result which represents connection or disconnection of the session between the image processing apparatus and the instruction server is different from a result derived from preceding packet transmission; and
- switching the state of the image processing apparatus to a state in which at least the connection confirmation packet can be transmitted, in a case where the state of the image processing apparatus is the power saving state when a time specified by the transmission interval elapses from transmission of the connection confirmation packet.

18. An instruction server configured to transmit instruction information to an image processing apparatus via a router having a firewall function, comprising:
- a communication device configured to transmit to a session server, which is configured to set up a session between the image processing apparatus and the instruction server, a connection confirmation packet for the session between the image processing apparatus and the instruction server; and
- a processor configured to adjust a transmission interval of the packet transmitted by the communication device, based on a connection state of the session between the instruction server and the image processing apparatus after connection confirmation, so that the transmission interval is within a session timeout period for the firewall function of the router by:
  - shortening the transmission interval in a case where the session between the image processing apparatus and the instruction server is disconnected and extending the transmission interval in a case where the session between the image processing apparatus and the instruction server is connected, and
  - decreasing a value of a time by which the transmission interval is shortened or extended, in a case where a result which represents connection or disconnection of the session between the image processing apparatus and the instruction server is different from a result derived from preceding packet transmission.

* * * * *